United States Patent
El-Khasawneh et al.

(10) Patent No.: US 12,240,544 B2
(45) Date of Patent: Mar. 4, 2025

(54) RECONFIGURABLE WALKING ROBOT

(71) Applicant: Khalifa University of Science and Technology, Abu Dhabi (AE)

(72) Inventors: Bashar El-Khasawneh, Abu Dhabi (AE); Abdur Rosyid Patrum, Abu Dhabi (AE); Cesare Stefanini, Pisa (IT)

(73) Assignee: Khalifa University of Science and Technology, Abu Dhabi (AE)

( * ) Notice: Subject to any disclaimer, the term of this patent is extended or adjusted under 35 U.S.C. 154(b) by 500 days.

(21) Appl. No.: 17/728,822

(22) Filed: Apr. 25, 2022

(65) Prior Publication Data

US 2022/0363326 A1 Nov. 17, 2022

Related U.S. Application Data

(60) Provisional application No. 63/184,505, filed on May 5, 2021.

(51) Int. Cl.
| | |
|---|---|
| *B62D 57/032* | (2006.01) |
| *B25J 9/00* | (2006.01) |
| *B25J 9/16* | (2006.01) |
| *B25J 15/00* | (2006.01) |

(52) U.S. Cl.
CPC .......... *B62D 57/032* (2013.01); *B25J 9/0009* (2013.01); *B25J 9/162* (2013.01); *B25J 15/0019* (2013.01)

(58) Field of Classification Search
CPC ....... B25J 9/0009; B25J 9/162; B25J 15/0019
See application file for complete search history.

(56) References Cited

U.S. PATENT DOCUMENTS

| | | | |
|---|---|---|---|
| 9,827,677 B1* | 11/2017 | Gilbertson | .............. A47L 11/24 |
| 2019/0072931 A1* | 3/2019 | Bank | ...................... B25J 9/1697 |

OTHER PUBLICATIONS

Axinte, et al., Free-leg Hexapod: A novel approach of using parallel kinematic platforms for developing miniature machine tools for special purpose operations, CIRP Annals, vol. 60, Issue 1, 2011, pp. 395-398, https://doi.org/10.1016/j.cirp.2011.03.024.

Rushworth, et al., Pre-gait analysis using optimal parameters for a walking machine tool based on a free-leg hexapod structure, Robotics and Autonomous Systems, vol. 70, 2015, pp. 36-51, https://doi.org/10.1016/j.robot.2015.04.001.

Olarra, et al., Machining with the WalkingHex: A walking parallel kinematic machine tool for in situ operations, CIRP Annals, vol. 66, Issue 1, 2017, pp. 361-364, https://doi.org/10.1016/j.cirp.2017.04.050.

Yang, et al., Locomotion Approach of REMORA: a REonfigurable MObile Robot for Manufacturing Applications. IROS: Intelligent Robots and Systems, Sep. 2011, San Francisco, CA, United States. pp. 5067-5072, (10.1109/IROS.2011.6094897).

(Continued)

*Primary Examiner* — Zoheb S Imtiaz
(74) *Attorney, Agent, or Firm* — Kilpatrick Townsend & Stockton LLP

(57) ABSTRACT

A robotic device is described. The robotic device includes segments and arms connected to a platform. A machining or another processing tool can be coupled to the platform. The segments can have one end attached to the platform and the other end attached to an attachment device. The attachment device can include an attachment surface/mechanism that can attach to a workpiece.

20 Claims, 21 Drawing Sheets

(56) References Cited

OTHER PUBLICATIONS

Silva, et al., "A Survey of Technologies for Climbing Robots Adhesion to Surfaces," 2008 IEEE International Conference on Computational Cybernetics, Stara Lesna, 2008, pp. 127-132, doi: 10.1109/ICCCYB.2008.4721392.
Schmidt, et al, Climbing robots for maintenance and inspections of vertical structures—A survey of design aspects and technologies, Robotics and Autonomous Systems, vol. 61, Issue 12, 2013, pp. 1288-1305, https://doi.org/10.1016/j.robot.2013.09.002.
Brusell, et al., A Survey on Pneumatic Wall-Climbing Robots for Inspection, 24th Mediterranean Conference on Control and Automation (MED), Jun. 21-24, 2016, Athens, Greece.

\* cited by examiner

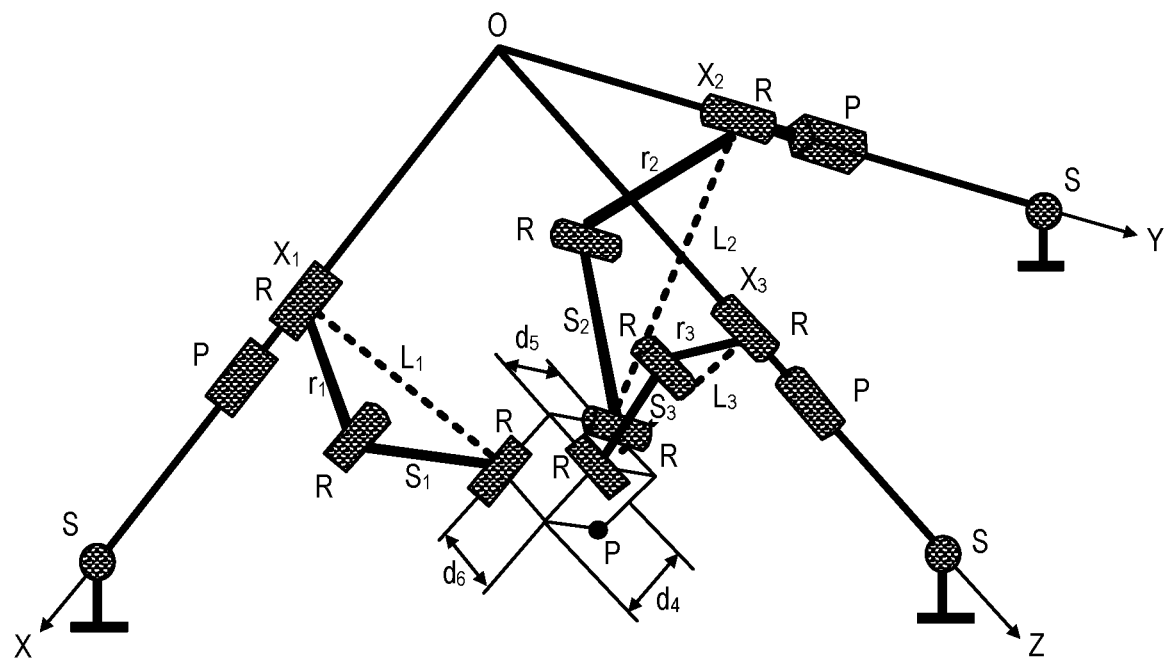
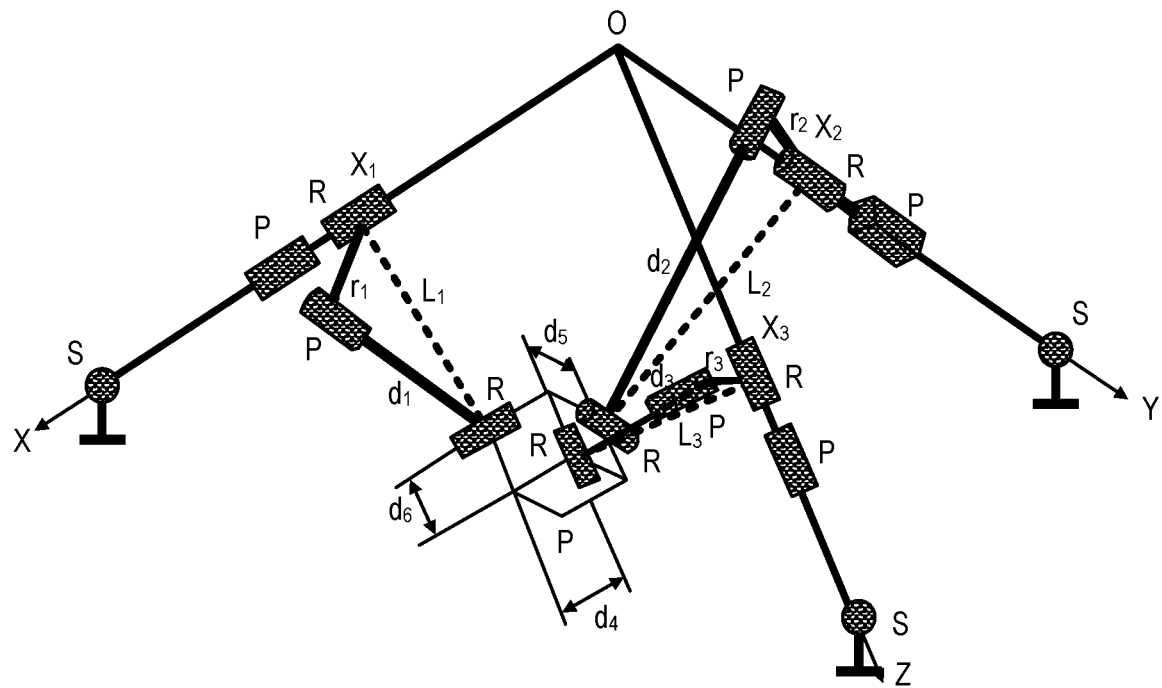
FIG. 6

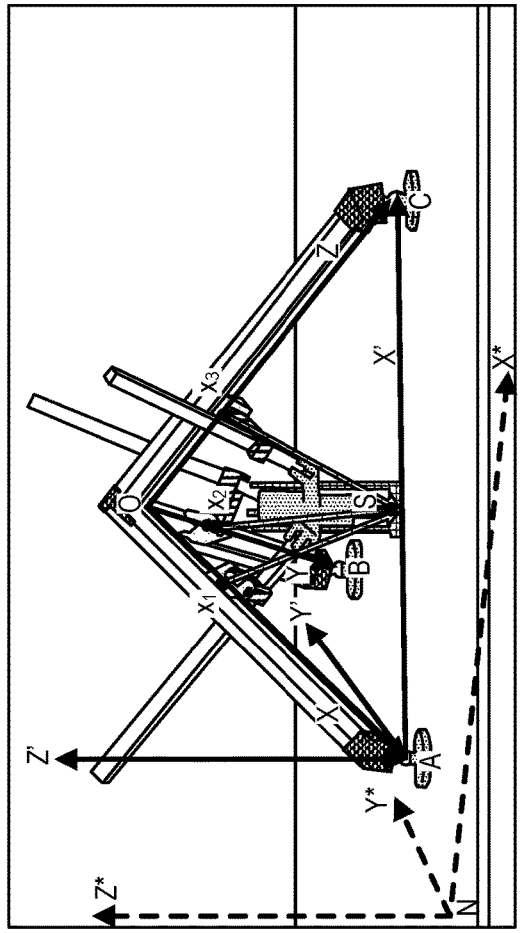
FIG. 9
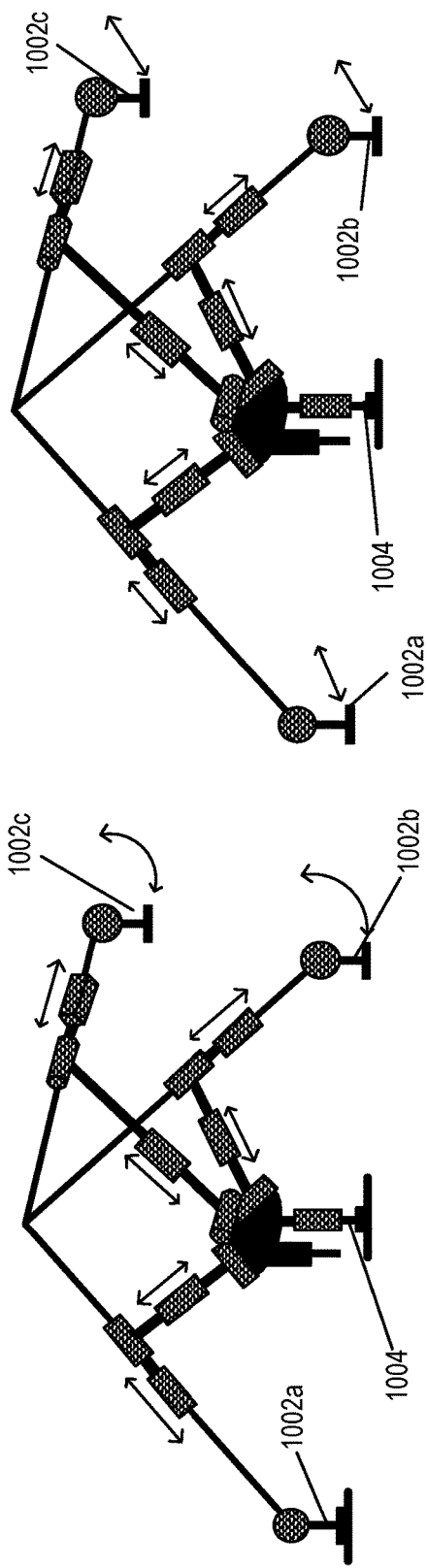
FIG. 10B
FIG. 10A

RECONFIGURABLE WALKING ROBOT

CROSS-REFERENCE TO RELATED APPLICATIONS

This application claims the benefit of U.S. Provisional Application No. 63/184,505, filed May 5, 2021, and titled "Reconfigurable Walking Robot," the entire contents of which are hereby incorporated for all purposes in their entirety.

BACKGROUND

Robots have been used to perform machining/processing tasks on large structures, such as airplane wings and fuselage, to increase the productivity and accuracy, etc. Fixed large structures or large structures unfeasible to be disassembled also require in-situ post-production treatments for maintenance or repair. In addition, it is advantageous to minimize human intervention when the large structures involve hazardous environments. Often, it is difficult to reach the location of the large structures due to a need to go through some narrow or confined spaces, so a large machine/robot is not suitable. Furthermore, with status-quo mobile robots being docked on the ground when performing machining/processing tasks on the structures, the compliance of the bodies connecting the workpiece/structure to the robot base and subsequently to the tool held by the robot end-effector may affect the machining/processing accuracy.

BRIEF DESCRIPTION OF THE DRAWINGS

Various embodiments in accordance with the present disclosure will be described with reference to the drawings, in which:

FIG. 6 is the moveable robot of FIG. 2 described in its local frame, according to various embodiments;

FIG. 9 illustrates example kinematics of the moveable robot of FIG. 2, according to various embodiments;

FIG. 10A illustrates a first moveable motion of the moveable robot of FIG. 2, according to various embodiments;

FIG. 10B illustrates a second moveable motion of the moveable robot of FIG. 2, according to various embodiments;

DETAILED DESCRIPTION

Figure 1:
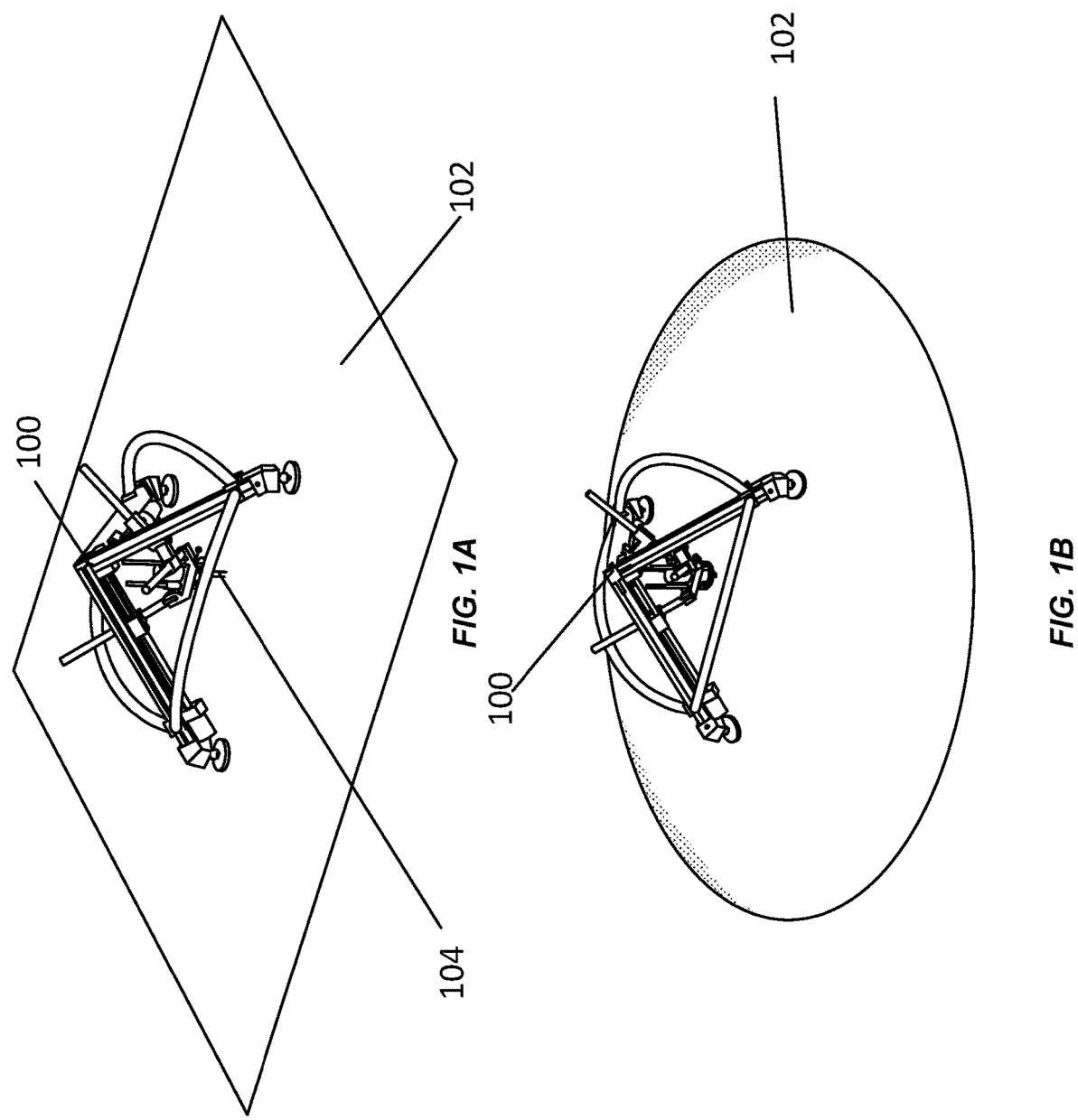
FIG. 1A is an illustration of an example of a moveable robot attached to a flat surface, according to various embodiments.
FIG. 1B is an illustration of an example of a moveable robot attached to a section of spherical surface, according to various embodiments.

Embodiments and techniques described herein are directed to a robot which can perform machining/processing tasks to a workpiece/structure. In various embodiments, the robot is capable of performing in-situ machining/processing on a large workpiece/structure through a direct attachment to the workpiece/structure. Additionally, the robot can walk on the surface of the workpiece/structure to change a setup position of the robot. In some embodiments, three motors can be used to perform the machining/processing and walking motions. The robot can be small and light and can be used to perform machining/processing tasks in a small space due to some obstructing parts. The robot can also be used to perform tasks on vertical surfaces such as walls or vertical surfaces of a large structure.

1. Introduction

Robots have been used to perform machining/processing tasks on large structures such as airplane wings and fuselages to increase productivity and accuracy of the machining/processing tasks. Some large structures, such as fixed large structures or large structures unfeasible to be disassembled, also require in-situ post-production treatments for maintenance or repair. Often it is difficult to reach the location of the large structures. In fact, most of the existing robots (some fixed, some others mobile, etc.) that are used to address such large structures are relatively large in size, which causes limited capability to go through some narrow or confined spaces. Additionally, it is advantageous to minimize human intervention when the large structures involve hazardous environments.

Furthermore, with the robots being docked on the ground when performing the machining/processing tasks on the structures, the compliance of the bodies connecting the workpiece/structure to the robot base and subsequently to the tool held by the robot end-effector may affect machining/processing accuracy. To overcome this issue, a direct attachment of the robot performing the machining/processing task to the workpiece/structure has been proposed. With such solution, the size of the robot can also be significantly reduced as it performs the machining/processing task directly on-structure. Axinte et al. [1] developed the free-leg hexapod aimed at performing an on-structure machining to a large structure. Axinte's robot provides six degrees of freedom (DOFs), i.e., three translations and three rotations. Every two legs are attached to a single pad and hence the hexapod has three pads. During machining/processing, the three pads are attached to the workpiece/structure surface. In this case, the workpiece/structure surface serves as the base of the hexapod. This work was further extended by adding walking capability to the hexapod [2, 3]. Instead of combining every two legs to a single pad, each leg is attached to a single pad. A transition in the walking motion is performed by lifting three legs while fixing the other three legs to a ground surface. When a destination is reached, the machining/processing can be performed after fixing all the six pads to the workpiece/structure surface so that the moving platform of the hexapod which holds a tool can be manipulated in six degrees of freedom as usual. Yang et al. [4] designed a reconfigurable walking robot for manufacturing called REMORA (REconfigurable MObile Robot for manufacturing Applications). Through simulation, the robot shows its walking and manipulation capability. This reconfigurable robot has a 6-DOF parallel kinematics topology with eight actuated legs, and hence, it is a redundantly actuated parallel mechanism. Every two legs are attached to a single serial clamping mechanism, so the robot becomes a quadruped when it walks.

The mechanism to clamp or attach such robots has been investigated by many researchers. Quite many of them have been developed for wall-climbing robots. In general, such mechanisms were developed based on (i) gripping to the surface, (ii) magnetic adhesion, (iii) pneumatic adhesion, i.e., using vacuum/negative pressure or suction, (iv) electro-adhesion, and (v) chemical adhesion. Surveys on the robotic adhesion systems can be found in [5-7].

Considering that the existing walking parallel robots involve high mobility, for example six-DOF mobility, the present disclosure proposes a novel walking parallel robot 100 with lower mobility. In fact, a robot with full mobility is more than enough to perform a five-axis machining/processing that only requires five DOFs (i.e., three translations and two rotations). Quite frequently, fewer DOFs are required to perform some types of machining/processing. For example, only three translational DOFs are required in a three-axis machining/processing task. The present disclosure proposes a walking parallel robot 100 capable of performing three-axis, on-structure machining/processing task. Due to the symmetric geometry of the robot 100, the tool 104 is always oriented in a perpendicular direction to the surface 102 of the workpiece/structure without extra effort to orient the tool 104, provided that the workpiece/structure surface 102 is flat (i.e., in FIG. 1A) or a section of spherical surface (i.e., in FIG. 1B). This capability is illustrated in FIGS. 1A-1B. In order to deal with workpiece/structure having an irregular surface, as well as to enable five-axis or six-axis machining/processing tasks when required, the three-axis robot can also be reconfigured to a five-axis robot or a six-axis robot through modular reassembly, joint locking/reconfiguration involving additional modular mechanisms, and the like.

As disclosed herein, revolute joints, prismatic joints, universal joints, and spherical joints are often abbreviated as R joints, P joints, U joints, and S joints, respectively. A kinematic chain of a limb is indicated by the respective letters starting from the base of the limb to the tip (terminal end) of the limb. For example, PRPR denotes a kinematic chain of a limb consisting of P, R, P, and R joints in an order starting from the base of the limb to the tip of the limb. Multiple limbs with a symmetric (for example, identical) joint topology are indicated by the number of the symmetric limbs followed by the joint topology of the limb, such as 3PRPR which indicates three symmetric limbs with PRPR kinematic chains. Further, acronyms T and R when used to indicate mobility mean translation and rotation, respectively. A number preceding T or R indicates the number of translational or rotational degrees of freedom, respectively. For example, 3T mobility means three translational degrees of freedom. Symbol is sometimes used to indicate perpendicularity between two adjacent joints.

2. Topology

Figure 2:
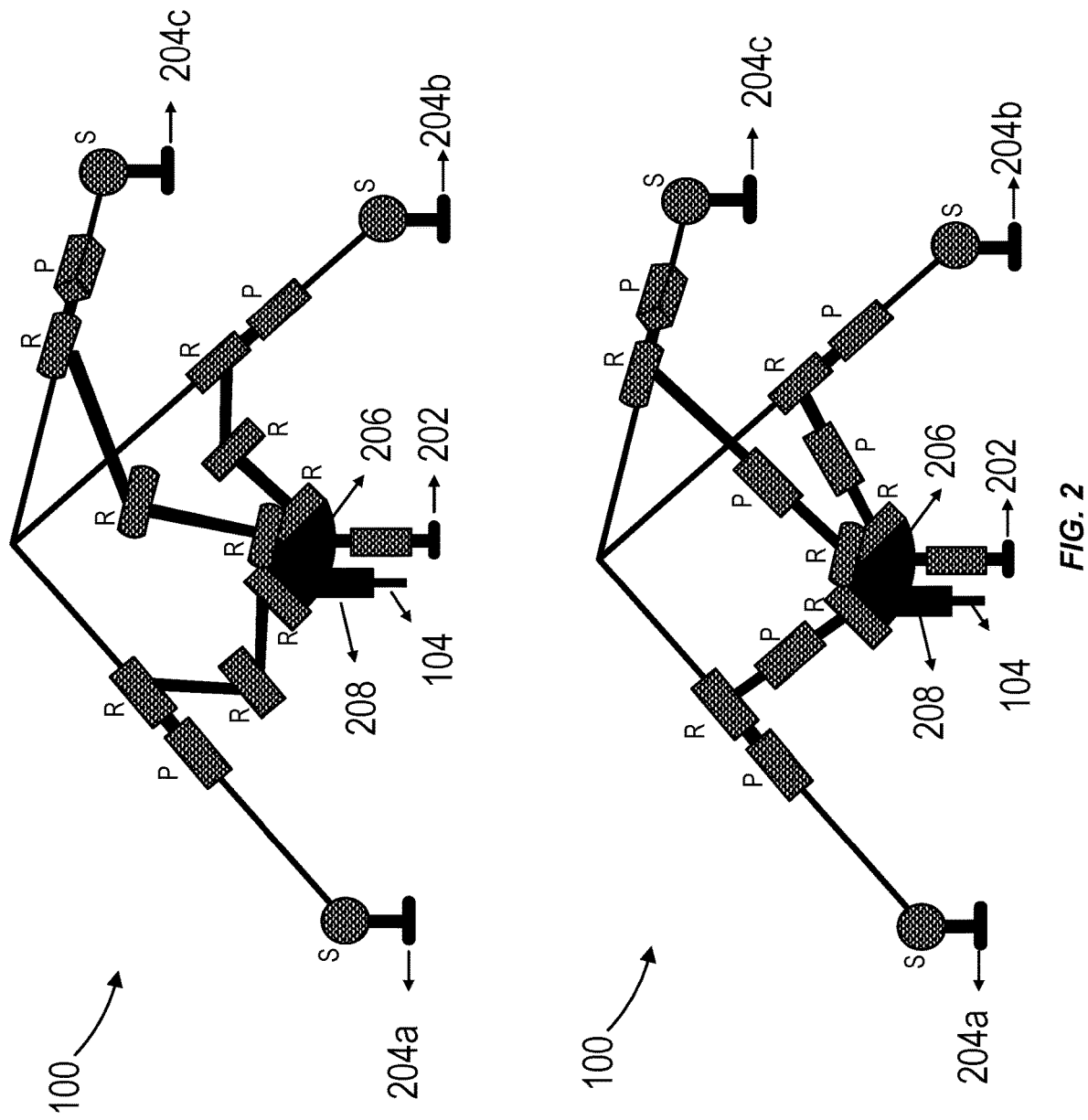
FIG. 2 is a schematic of an example of a moveable robot, according to various embodiments.

The three-axis robot has either a symmetric 3PRRR or a 3PRPR joint topology in which the proximal P joints are sliding along or parallel with the three frames of the pyramid, while the proximal R joints are rotating about axes that are collinear or parallel with the three frames of the pyramid. In the 3PRRR topology, the intermediate and distal R joints are also collinear or parallel with the three frames of the pyramid. In the 3PRPR topology, the intermediate P joints connect the proximal R joints with the distal R joints and are sliding along the direction of the limbs, and the distal R joints are parallel with the axes of the proximal P and R joints, which are the three frames of the pyramid. Both of the topologies provide 3T mobility of the end-effector without any parasitic rotational motion. In the 3PRRR mechanism, the proximal P joints are typically actuated. In the 3PRPR mechanism, either the proximal P joints or intermediate P joints can be actuated. In the former case, a maximally regular kinematic behavior is obtained since the robot includes a unit, diagonal, Jacobian matrix. The 3PRRR or 3PRPR robot includes three frames (beams) with an identical length, which form a shape of a tetrahedron (triangular pyramid). The ends of the three frames of the pyramid are attached to spherical joints, whereas the spherical joints are attached to attachment pads 204a-c, which can be implemented by using vacuum suckers, magnetic pads, any other adhesion/attachment technologies, or any suitable combination thereof. However, in some circumstances such as machining/processing on a flat surface, the spherical joints can be locked or eliminated. The attachment pads can be placed on a workpiece/structure surface. When the attachment pads are activated, the robot is attached to the workpiece/structure surface, and the 3PRRR or the 3PRPR mechanism makes 3T motion to perform a machining task such as drilling a hole perpendicular to the workpiece/structure surface. The topology of the robot can be referred to as 3A+3S+3PRRR or 3A+3S+3PRPR, where A, S, P, and R respectively indicate the attachment, the spherical joint, the prismatic joint, and the revolute joint, and where the + sign indicates a serial connection. When the spherical joints are locked or eliminated, the robot topology becomes 3A+3PRRR or 3A+3PRPR. The schematic of the robot 100 is illustrated in FIG. 2. For the purpose of walking motions, a support 202, which has one or more attachment pads 302, is attached to the moving platform 206, which can include or otherwise be affixed to a spindle 208 and the tool 104. If the support 202 is retractable, it is retracted when the robot 100 is performing a manipulation task, whereas it is extended and attached to the surface 102 of a workpiece/structure when the robot 100 is making a walking motion. However, the retractability is optional. The support with the attachment pad(s) 302 can also be fixed to the end-effector. Alternatively, a retractable tool holder 350, as illustrated in FIG. 3C, can be used when the support with the attachment pad(s) are fixed to the end-effector.

Figure 3A:
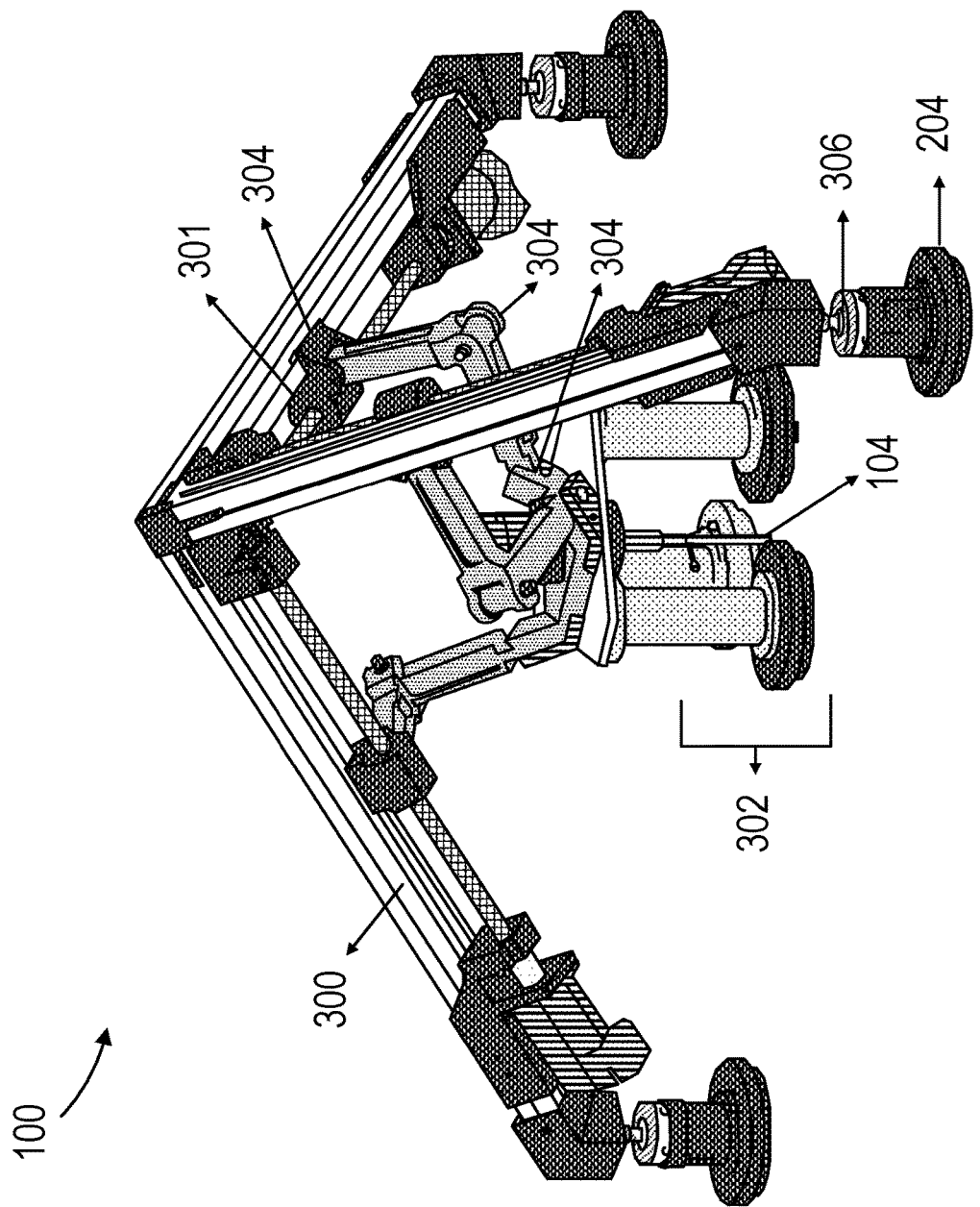
FIG. 3A is an illustration of an example of a moveable robot, according to various embodiments.
Figure 3B:
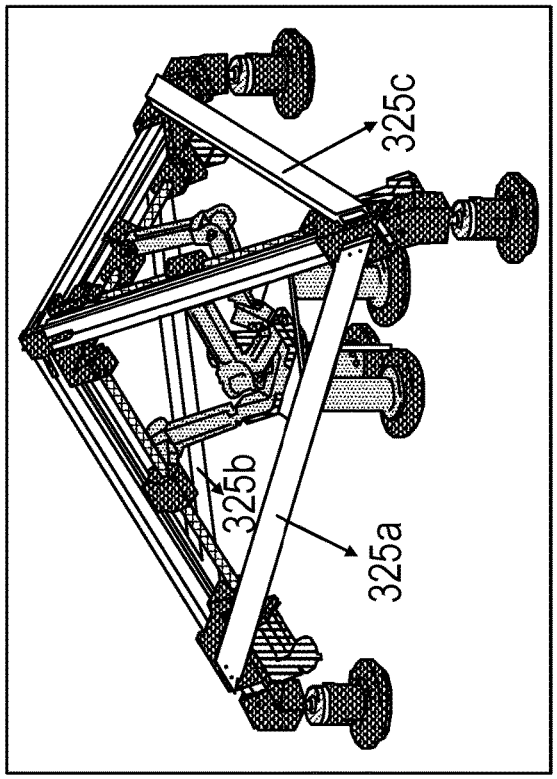
FIG. 3B is an illustration of the moveable robot of FIG. 3A with stiffeners added, according to various embodiments.
Figure 3C:
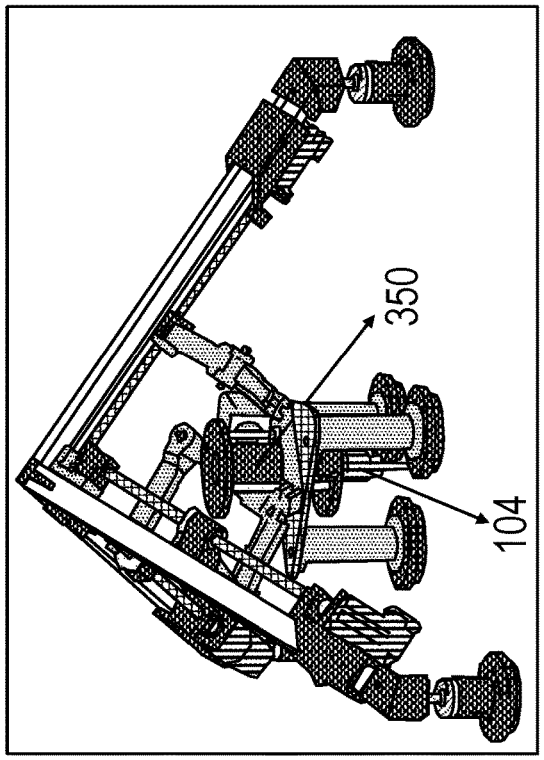
FIG. 3C is an illustration of the moveable robot of FIG. 3A including a retractable tool, according to various embodiments.
Figure 4A:
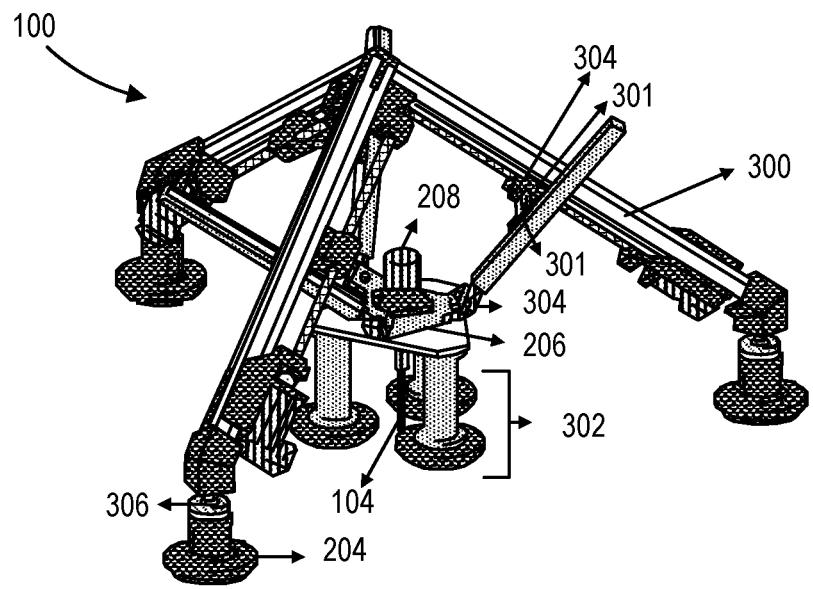
FIG. 4A is an illustration of an example of a moveable robot, according to various embodiments.
Figure 4B:
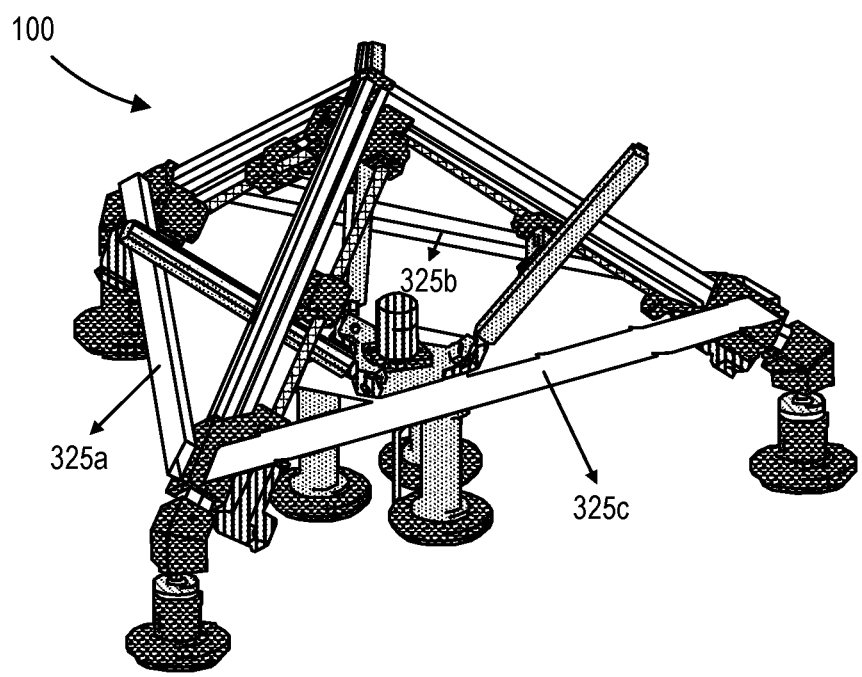
FIG. 4B is an illustration of the moveable robot of FIG. 4A with stiffeners added, according to various embodiments.

FIG. 3A and FIG. 4A show implementations of the 3PRRR and 3PRPR robots 100, respectively, with the proximal P joints 301 being actuated. Frames 300 of the robot 100 form a pyramid. The robots 100 include P joints 301, R joints 304, and S-joints 306. Motorized lead/ball screws combined with linear guides serve as the active, proximal P joints 301. In the 3PRPR robot 100, linear bearings are used as the passive intermediate P joints. Batteries and electronics can be mounted on board at the apex of the pyramid. As shown in FIGS. 3A-4B, multiple attachment pads 302 that are attached to the end-effector can be used to increase the stability of the robot 100, particularly during walking motion, and to increase the attachment force. Some advantages of actuating the proximal P joints 301 include (i) actuators are placed on the base (increasing the stability of the robot); (ii) easier placement of linear encoders (if used); (iii) available closed-form solution of the forward kinematics; and (iv) unity mapping (with possibly added offsets) between joint space and task space. As shown in FIG. 3B and FIG. 4B, stiffeners 325a-c can be added to the pyramid. Various geometries of stiffeners 325a-c can be used to provide the stiffening function. The stiffeners 325a-c can be positioned near the base to maximize the stiffening effect but slightly elevated from the bottom to accommodate curvy surface and to avoid obstacles on the surface 102.

3. Determination of the Angles Between the Pyramid Structure Beams

To determine the best angle between the structure beams of the triangular pyramid, a comparison of several aspects was conducted. The aspects include the kinematic behavior, stability and stiffness of the pyramid structure, workspace, and stiffness of the mechanism. Three representative angles are compared: 90 degrees, 60 degrees (to represent angles less than 90 degrees), and 120 degrees (to represent angles more than 90 degrees). To make a fair comparison, an identical length of the pyramid structure beams and the maximum length of the intermediate P joints is used in all the three configurations.

In terms of the kinematic behavior, the use of pyramid having angles of 90 degrees provides maximally regular workspace with decoupling between the axes when the proximal P joints are actuated. This property cannot be achieved when the other angles are used.

In terms of the stability of the pyramid structure, the angle of 90 degrees results in moderate stability. When the angle is 60 degrees, the posture of the pyramid is less stable since the pyramid is taller. On the other hand, the stability is the best when the angle is 120 degrees.

In terms of the stiffness of the pyramid structure, while the angle of 90 degrees has good stiffness in both vertical and horizontal directions, each of the other two angles have contradicting stiffness quality in both the directions. The angle of 60 degrees (taller pyramid) provides higher vertical stiffness but lower horizontal stiffness. This is because a vertical load results in lower bending load exerted to the pyramid structure beams due to the smaller width of the pyramid, whereas a horizontal load at the apex of the pyramid results in higher bending load exerted to the pyramid structure beams due to the larger height of the pyramid. On the other hand, the angle of 120 degrees provides higher horizontal stiffness but lower vertical stiffness. This is because a vertical load results in higher bending load exerted to the pyramid structure beams due to the larger width of the pyramid, whereas a horizontal load at the apex of the pyramid results in lower bending load exerted to the pyramid structure beams due to the smaller height of the pyramid.

Figure 5:
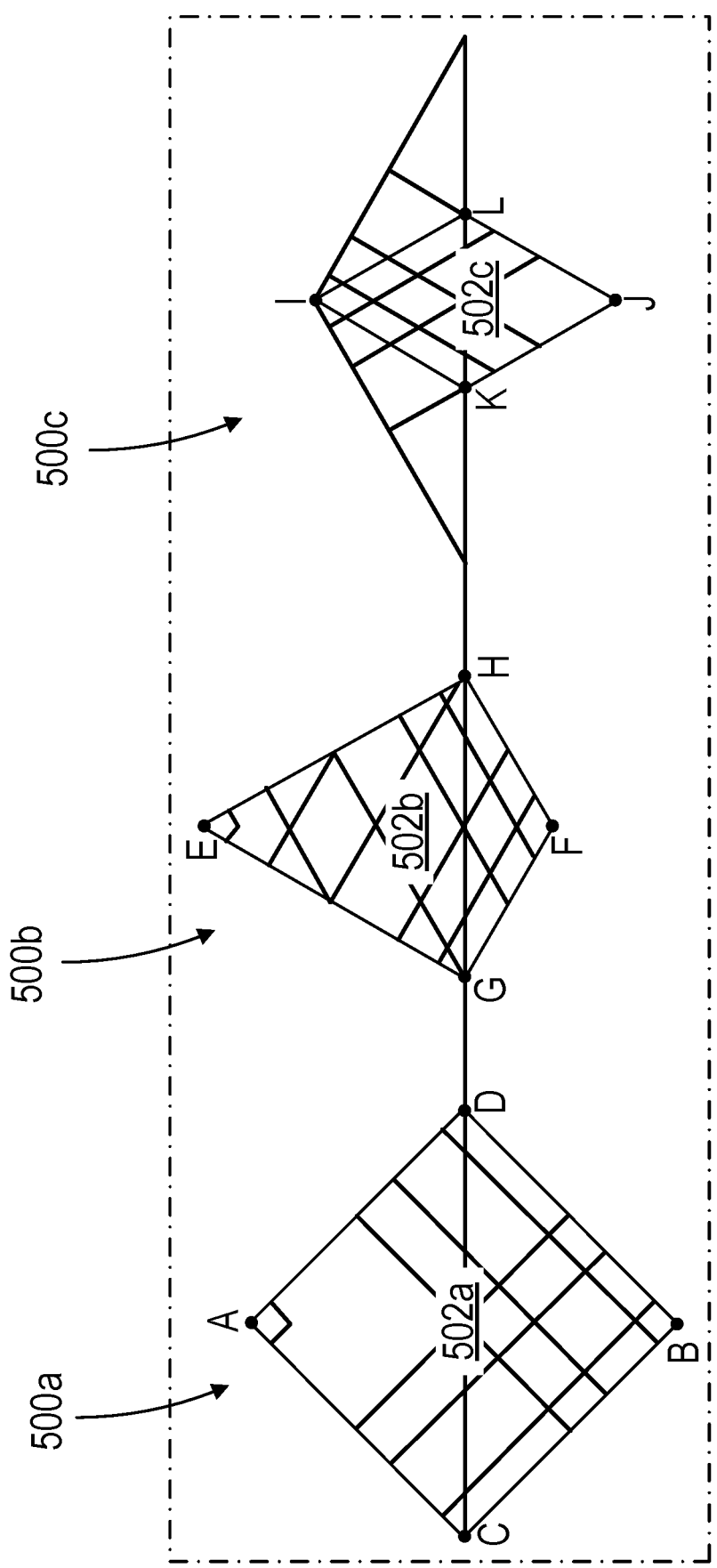
FIG. 5 is a two-dimensional representation of an example of workspaces that can be used with the moveable robot of FIG. 2, according to various embodiments.

In terms of the workspace, the comparison is illustrated in FIG. 5 with areas 502a-c indicating the side views (cross-section views) of the workspaces obtained by moving the joints within respective limits. The proximal P joints are moved from zero to the length of the pyramid frames, whereas the other joints are bounded by their motion limits. As illustrated, the angle of 90 degrees (corresponding to the side view 500a) provides the largest workspace area, width, and depth. The angle of 60 degrees (corresponding to the side view 500b) provides intermediate workspace area, width, and depth. The angle of 120 degrees (corresponding to the side view 500c) provides the least workspace area, width, and depth. Accordingly, the angle of 120 degrees is discarded from the preference. Additionally, the angle of 90 degrees is the best in terms of the workspace. The large depth of the workspace is advantageous in some applications, such as drilling a deep hole, whereas the large width is advantageous to cover a wider area with a single setup (i.e. without a need to move the whole machine).

Finally, in terms of the stiffness of the mechanism, evaluated as a function of the limb lengths, the stiffness qualities of the mechanism used with the pyramid having the angles of 90 and 60 degrees are similar.

As the angle of 90 degrees provides superiority in the kinematic behavior and workspace along with moderate stability and stiffness of the pyramid structure, the angle of 90 degrees is preferred. The use of the pyramid structure with the angle of 90 degrees makes the 3PRRR and 3PRPR mechanisms orthogonal.

Although the pyramid structure with the angle of 90 degrees is preferred, one may also use a pyramid structure with any other angle when possible, based on certain considerations which may depend on the application. In such a case, for example, the proximal and distal R joints in each of the three limbs of the 3PRPR mechanism should be parallel with the three frames of the pyramid. This geometric condition should be satisfied in the joint arrangement of the 3PRPR mechanism in order to provide 3T mobility to the end-effector. If both the proximal and distal R joints or only the distal R joints in each of the three limbs are perpendicular to the three frames of the pyramid, only 1T mobility along the axisymmetric axis of the pyramid is provided by the end-effector.

4. Kinematics of 3PRRR and 3PRPR Mechanisms

4.1. Kinematics of 3PRRR and 3PRPR Mechanisms in XYZ Frame

The kinematics of the 3PRRR and 3PRPR mechanisms are simpler when expressed in the local XYZ frame, as illustrated in FIG. 6. Assuming that the three proximal R joints are located at the same positions with the proximal P joints, the position of the three proximal P joints are denoted by points $X_1$, $X_2$, and $X_3$, which correspond to displacements of $x_1$, $x_2$, and $x_3$ from the origin of the XYZ frame (i.e., point O). The three proximal R joints rotate about the X, Y, and Z axes. The rotations are defined by angles $a_1$, $a_2$, and $a_3$, respectively. In the 3PRPR mechanism, the axes of the intermediate P joints can be shifted from the axes of the proximal R joints by constants $r_1$, $r_2$, and $r_3$. In other words, the values of $r_1$, $r_2$, and $r_3$ can be either zero or non-zero. The actual sliding displacements of the intermediate P joints are given by $d_1$, $d_2$, and $d_3$. For simplicity, virtual sliding displacements of the intermediate P joints namely $L_1$, $L_2$, and $L_3$ are defined as:

$$L_i = \sqrt{r_i^2 + d_i^2} \text{ where } i=1,2,3 \quad (1)$$

In the 3PRRR and 3PRPR mechanisms, the three distal R joints and the end-effector P(x,y,z) create a virtual cube with edges parallel with X, Y, and Z axes, namely $d_4$, $d_5$, and $d_6$. Although theoretically the values of $d_4$, $d_5$, and $d_6$ can be zero, for example all the distal R joints and the end-effector P are coincident, the values of $d_4$, $d_5$, and $d_6$ are typically non-zero in a real implementation.

For the 3PRRR and 3PRPR mechanisms, when the proximal P joints are actuated, the inverse and forward kinematics solution is the following:

$$x = x_1 \quad (2)$$

$$y = x_2 \quad (3)$$

$$z = x_3 \quad (4)$$

In the physical implementation of both the 3PRRR and 3PRPR mechanisms, when the proximal P joints are actuated, it is possible to provide offsets $\Delta x$, $\Delta y$, and $\Delta z$ between the proximal P joints' positions and the end-effector position. Accordingly, the inverse and forward kinematics solution becomes the following:

$$x = x_1 + \Delta x \quad (5)$$

$$y = x_2 + \Delta y \quad (6)$$

$$z = x_3 + \Delta z \quad (7)$$

If the intermediate P joints in the 3PRPR mechanism are actuated, the inverse kinematics solution is no more provided by a unity mapping between the active joint position and the end-effector position as shown in Equations (2)-(4). Furthermore, actuating the intermediate P joints leads to a more complicated solution of the forward kinematics, although the forward kinematics can be solved easily with a numerical method.

Figure 7:
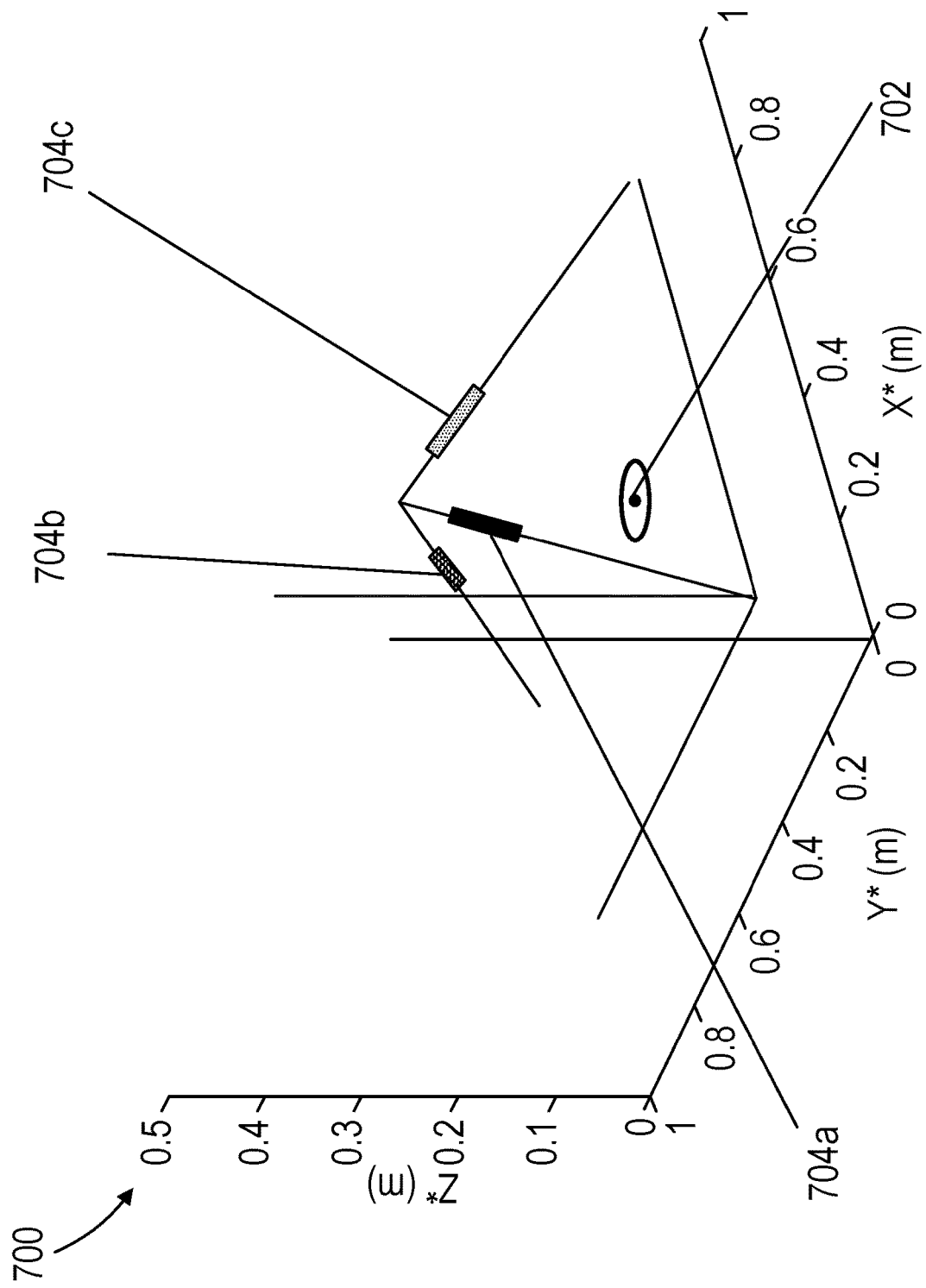
FIG. 7 is the moveable robot of FIG. 2 positioned on a workpiece while making an exemplary trajectory, according to various embodiments.
Figures 8A, 8B:
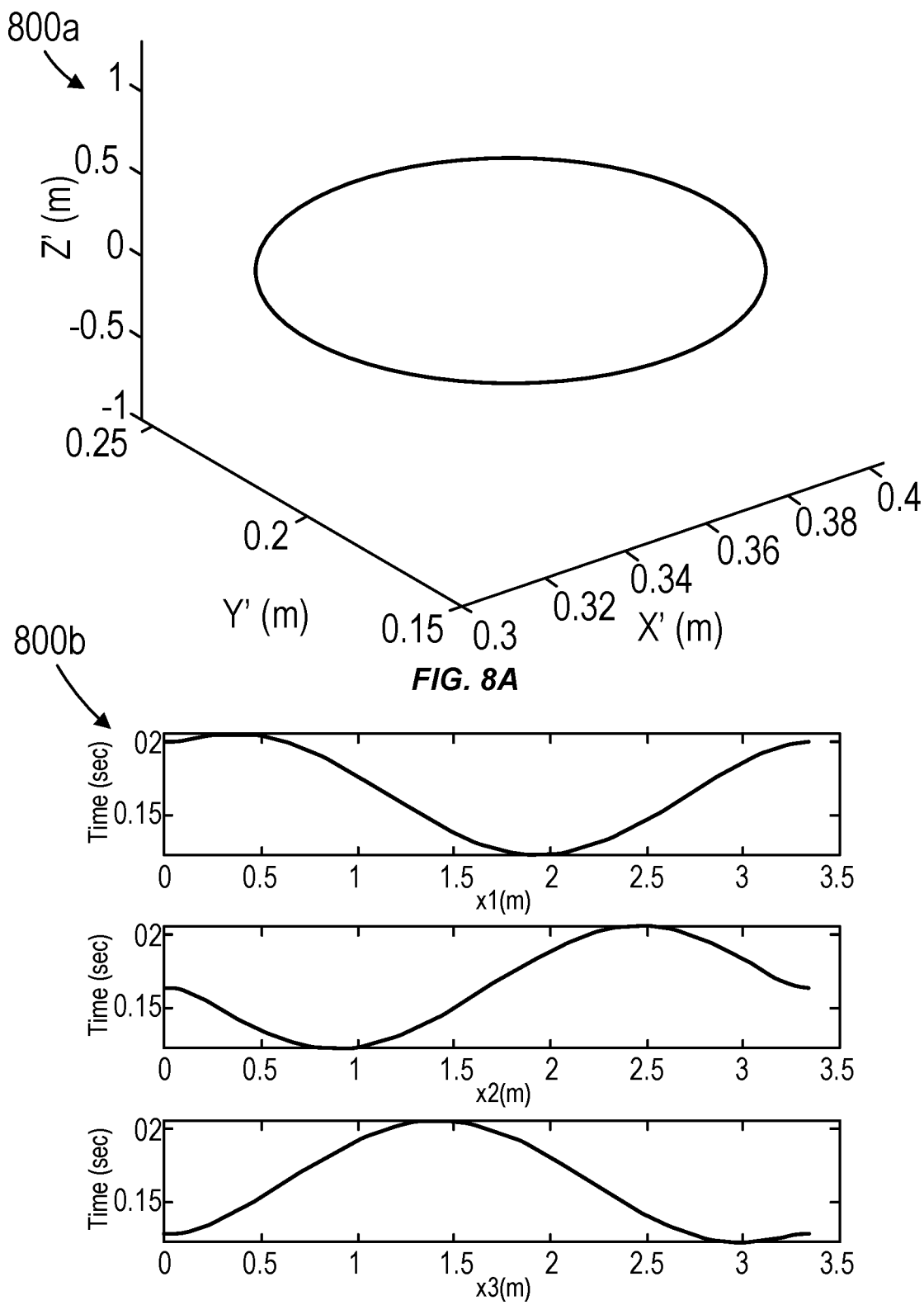
FIG. 8A illustrates the position of the exemplary trajectory of the end-effector of the moveable robot of FIG. 7, according to various embodiments.
FIG. 8B illustrates positions of proximal prismatic joints of the moveable robot of FIG. 7, according to various embodiments.

FIG. 7 is a plot 700 illustrating a full-circle trajectory 702 of the end-effector that is coplanar with the base plane of the robot 100. The plot 700 also includes the corresponding paths 704a-c of the three sliders. The plots 800a-b of the circle in the X'Y'Z' frame and the corresponding positions of the three sliders in the XYZ frame are illustrated in FIG. 8. The full circle lies on the X'Y' plane, with a constant value in the Z' axis. In practice, the full-circle trajectory can be conveniently defined in the X*Y*Z* frame which is fixed to the workpiece. Since, initially, the full circle is defined in the X*Y*Z* frame, the positions of the three sliders $x_1$, $x_2$, and $x_3$ expressed in the XYZ frame are computed based on the inverse kinematics of the 3PRPR mechanism and the transformation from the X*Y*Z* frame to the X'Y'Z' frame and subsequently to the XYZ frame.

4.2. Kinematics of 3PRRR and 3PRPR Mechanisms in X'Y'Z' and X*Y*Z* Frames

In the remainder of the present disclosure, for conciseness, illustrations of the mechanisms will only show the 3PRPR mechanism to represent both the 3PRRR and 3PRPR mechanisms.

Although the kinematics of the 3PRRR and 3PRPR mechanisms is simpler when expressed in the XYZ frame, in practice, the position of features to be machined/processed, such as holes, should be expressed with respect to a frame fixed to the workpiece. Consequently, the end-effector position P which has a constant transformation with the tool center point should be defined with respect to the frame fixed to the workpiece. Thus, three coordinate frames namely XYZ, X'Y'Z', and X*Y*Z* frames as illustrated in FIG. 9 are used.

As illustrated in FIG. 9, the XYZ frame with an origin O is a frame attached to the pyramid of the 3PRRR or 3PRPR mechanisms. The X, Y, and Z axes are along the segments O-A, O-B, and O-C, respectively. The X'Y'Z' frame is also attached to the pyramid, but the origin of the X'Y'Z' frame is placed at A. The X' axis is along a virtual segment A-C, whereas Y' is perpendicular to the X' axis. The X' and Y' axes make a plane that is coplanar with the bottom surface of the pyramid. Based on the right-hand rule, the Z' axis is an axis parallel with the center line of the pyramid, in a direction from the bottom toward the apex of the pyramid, through point A. The X*Y*Z* frame is fixed to the workpiece with an origin N. When the workpiece is stationary, the X*Y*Z* frame is an inertial frame. For convenience, the X* and Y* axes can be placed to be coplanar with the workpiece surface whereas the Z* axis is normal to the workpiece surface.

Let the end-effector position in the XYZ frame be (x, y, z). Accordingly, the end-effector position can be expressed in the X'Y'Z' frame as follows:

$$\begin{bmatrix} x' \\ y' \\ z' \end{bmatrix}_{X'Y'Z'} = (r_{AO})_{X'Y'Z'} + R_{X'Y'Z'}^{XYZ} \begin{bmatrix} x \\ y \\ z \end{bmatrix}_{XYZ} \quad (8)$$

-continued $$\begin{bmatrix} x \\ y \\ z \end{bmatrix}_{XYZ} = R_{X'Y'Z'}^{XYZ-1} \left( \begin{bmatrix} x' \\ y' \\ z' \end{bmatrix}_{X'Y'Z'} - (r_{AO})_{X'Y'Z'} \right) \quad (9)$$

where $(r_{AO})_{X'Y'Z'}$, which is a function of the geometry of the pyramid, denotes the position vector of point O (i.e., the origin of the XYZ frame) with respect to point A (i.e., the origin of the X'Y'Z' frame) expressed in the X'Y'Z' frame. $R_{X'Y'Z'}^{XYZ}$ denotes the rotation matrix of the XYZ frame with respect to the X'Y'Z' frame.

If the pyramid includes the angle of 90 degrees between its frames (beams), let the length of each pyramid beam be L. Accordingly, the vector $(r_{AO})_{X'Y'Z'}$ and the constant rotation matrix $R_{X'Y'Z'}^{XYZ}$ are respectively given by the following:

$$(r_{AO})_{X'Y'Z'} = [0.7071 L \ 0.4082 L \ 0.57735 L]^T \quad (10)$$

$$R_{X'Y'Z'}^{XYZ} \begin{bmatrix} -0.7071 & 0 & 0.7071 \\ -0.4082 & 0.8165 & -0.4082 \\ -0.5774 & -0.5773 & -0.5774 \end{bmatrix} \quad (11)$$

Once the end-effector position in the XYZ frame is obtained, the inverse kinematic solution is available in simpler expressions.

5. Walking Patterns

Two walking patterns are defined in order to move the whole robot to another pose on a workpiece surface. During a single walking step in both the walking patterns, the active joint positions $x_1$, $x_2$, and $x_3$ are changed to make a walking motion.

First walking pattern: As illustrated in FIG. 10A, one base leg 1002a is attached to the workpiece surface 102, two base legs 1002b-c are free, the support 1004 is attached to the workpiece surface 102, and the mechanism limbs change lengths to make the motion. The resulting motion is 3D rotational motion on the workpiece surface 102. Such rotational motion can be performed about any of the three attachment pads. When the workpiece surface is flat, a 2D rotational motion, which is a special case of the 3D rotational motion, can be performed. However, when the workpiece surface 102 is not flat due, for example, to the presence of rivet heads, bolt heads, or steps, then a 3D rotational motion is required in which the free attachment pads not only perform a horizontal rotation on the workpiece surface but also are lifted from the workpiece surface in order to avoid the obstacles.

Second walking pattern: As illustrated in FIG. 10B, all the base legs 1002a-c are free, the support 1004 is attached to the workpiece surface 102, and the mechanism limbs change lengths to make the motion. The resulting motion is 3D translational motion on the workpiece surface. This walking motion is performed in the following sequence:

Step 1: Initial pose. The support 1004 and all the attachment pads are attached to the workpiece surface.

Step 2: All the attachment pads are released while the support 1004 is still attached to the workpiece surface 102. Subsequently, the active joint positions are changed to make the motion. The change of the active joint positions should be made such that all the free attachment pads move to the expected new positions on the workpiece surface 102 through a certain walking trajectory.

Step 3: New pose upon landing. The support 1004 and all the attachment pads are attached to the workpiece surface 102. This completes a single walking step.

Step 4: This is only performed if another walking step is going to be made. Move the support 1004 to a new position on the workpiece surface 102. This is the initial position of the next walking step.

6. Kinematics of the First Walking Pattern

Figure 11:
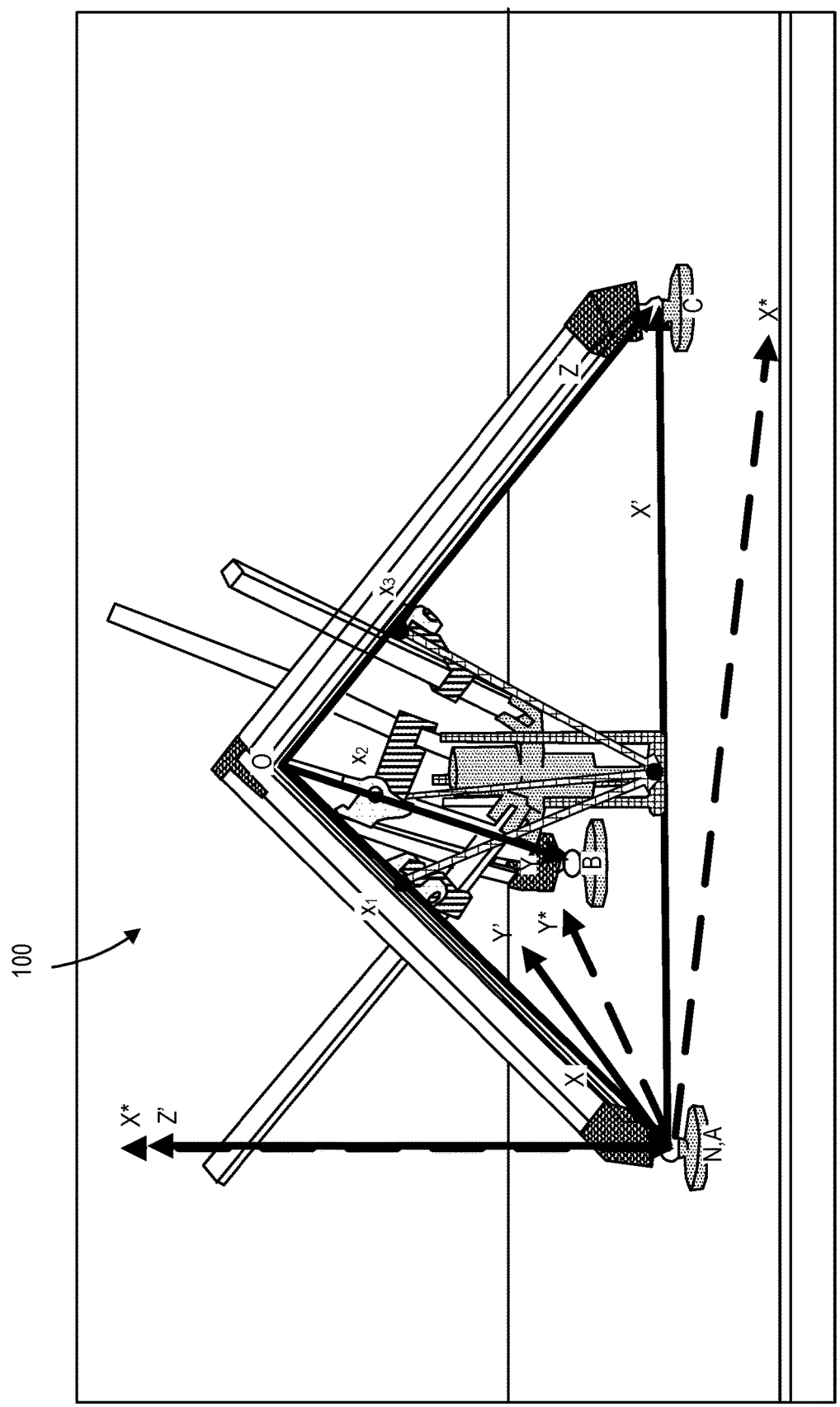
FIG. 11 illustrates a first moveable motion using the kinematics of FIG. 9, according to various embodiments.

In order to describe the walking motions, the three coordinate frames, as presented earlier, illustrated in FIG. 11, are used. To conveniently describe the first walking motion, the origin of the X'Y'Z' frame, A, is coincident with the origin of the X*Y*Z* frame. Thus, when the robot 100 rotates about point A, which in this case is coincident with point N, the X'Y'Z' frame makes a rotation with respect to the X*Y*Z* frame. In a more general setup, the origin of the X'Y'Z' frame should not be always coincident with the origin of the X*Y*Z* frame. The coincidence of the origins of the two frames presented here is just for simplicity to describe the first walking pattern.

In a 3D rotation, let the frame X'Y'Z' attached to the robot 100 make rotations of $\eta_1$ about X' axis, $\eta_2$ about Y' axis, and $\eta_3$ about Z' axis. Due to the rotation, the position of point B in the X*Y*Z* frame, $r_{NB}$, moves to a new position $B^\dagger$, $r_{NB}^\dagger$, whereas the position of point C, $r_{NC}$, moves to a new position $C^\dagger$, $r_{NC}'$, given by the following:

$$(r_{NB'})_{X^*Y^*Z^*} = R_{X^*Y^*Z^*}^{X'Y'Z'}(r_{NB})_{X^*Y^*Z^*} \quad (12)$$

$$(r_{NC'})_{X^*Y^*Z^*} = R_{X^*Y^*Z^*}^{X'Y'Z'}(r_{NC})_{X^*Y^*Z^*} \quad (13)$$

where the rotation matrix $R_{X^*Y^*Z^*}^{X'Y'Z'}$ defines the rotation of the robot frame X'Y'Z' with respect to the workpiece frame X*Y*Z*. The rotation includes three elementary rotations as mentioned above. For example, the rotation includes rotations of $\eta_1$ about X' axis, $\eta_2$ about Y' axis, and $\eta_3$ about Z' axis. Since the rotation is composed of three elementary rotations, which indicate a three-DOF motion, three among the six position coordinates of points B and C are dependent on the other three coordinates.

If the robot only makes a planar motion (i.e., rotates about the Z* axis) Equations (12) and (13) still apply, but the rotation matrix becomes an elementary rotation matrix about Z* axis with a rotation angle $\eta_3$. The z components of the position vectors of points B and C accordingly do not change. Since the rotation is only of the angle $\eta_3$, which indicates a single DOF motion, the position of point B and C are dependent on each other. For the same reason, the x and y components of point B as well as point C are dependent on each other.

Figure 12A:
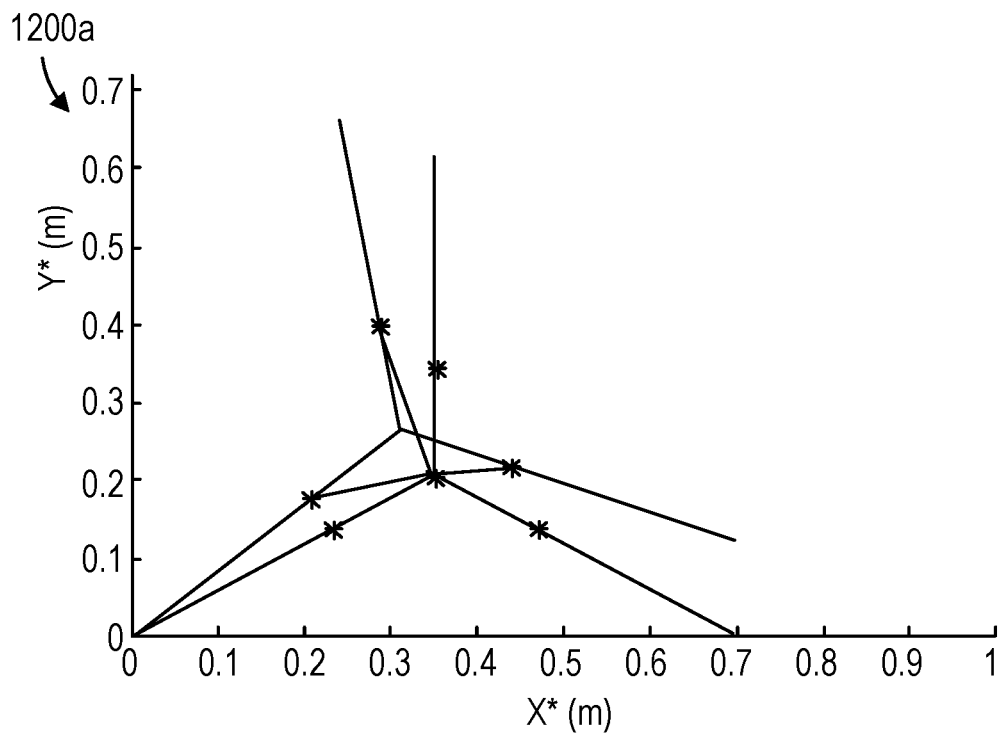
FIG. 12A is a top view of a first position and of a second position of the moveable robot of FIG. 2 after a planar rotation, according to various embodiments.
Figure 12B:
FIG. 12B is a side view of a first position and of a second position of the moveable robot of FIG. 2 after a planar rotation, according to various embodiments.
Figure 13A:
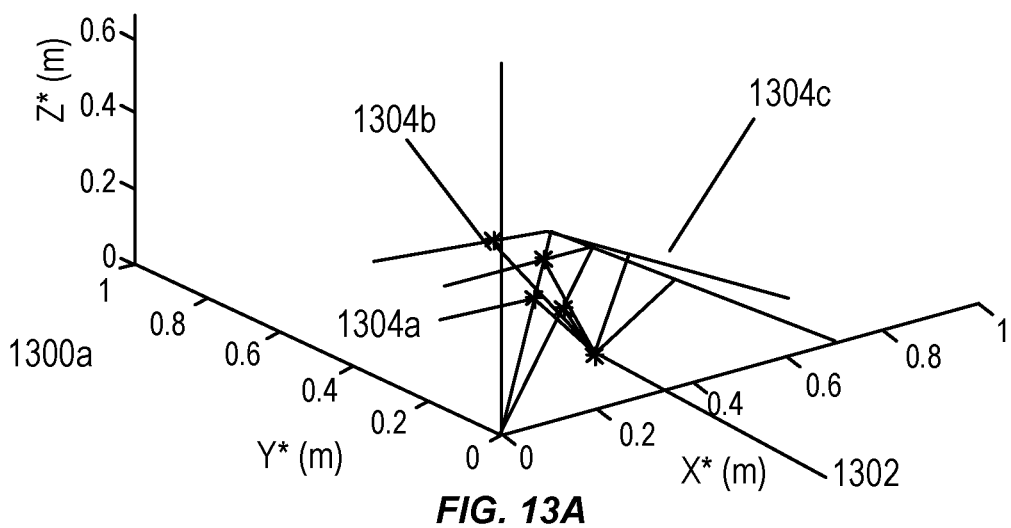
FIG. 13A is a three-dimensional view of a first position and of a second position of the moveable robot of FIG. 2 after a three-dimensional rotation, according to various embodiments.
Figure 13B:
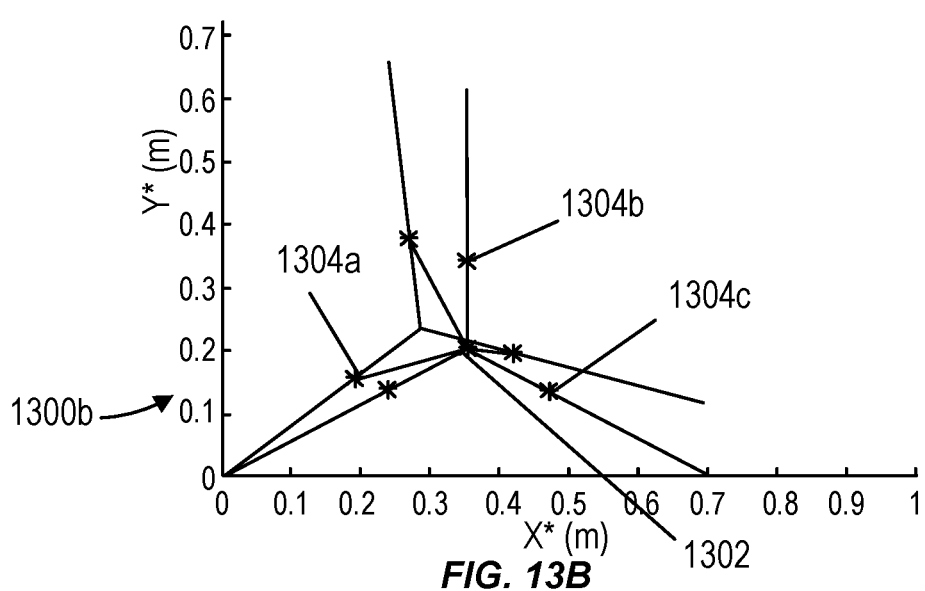
FIG. 13B is a top view of a first position and of a second position of the moveable robot of FIG. 2 after a three-dimensional rotation, according to various embodiments.
Figure 13C:
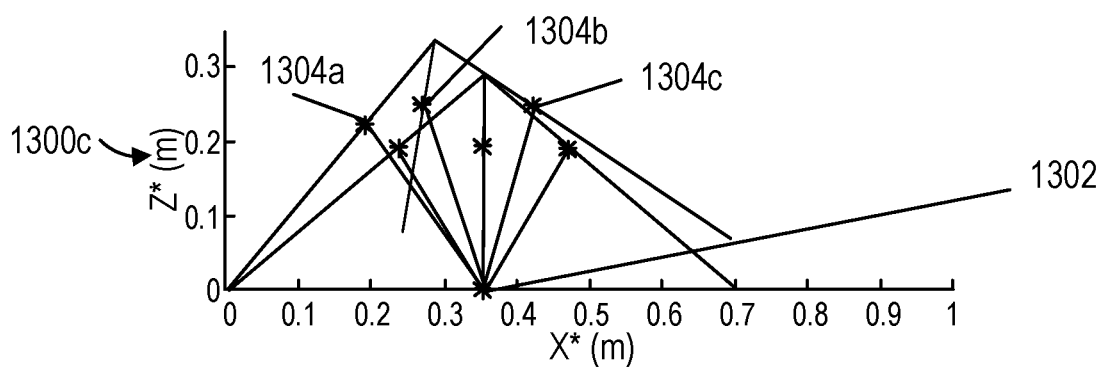
FIG. 13C is a side view of a first position and of a second position of the moveable robot of FIG. 2 after a three-dimensional rotation, according to various embodiments.

FIG. 12 shows the top view 1200a and the side view 1200b of the initial and new poses of the robot 100 after a planar rotation with the rotation angle of $\eta_3=10$ degrees. FIG. 13 shows the 3D view 1300a, the top view 1300b, and the side view 1300c of the initial and new poses of the robot 100 after a 3D rotation with the rotation angles of $\eta_1=5$ degrees, $\eta_2=-5$ degrees, and $\eta_3=10$ degrees in the XYZ sequence of rotation. Point 1302 indicates that the support is attached to the workpiece. The position of the support is not changed in a single walking step of both the first and the second walking patterns. Points 1304a-c indicate the position of the sliders (i.e., proximal prismatic joints) of the first, second, and third limbs, respectively.

7. Kinematics of the Second Walking Pattern

Figure 14:
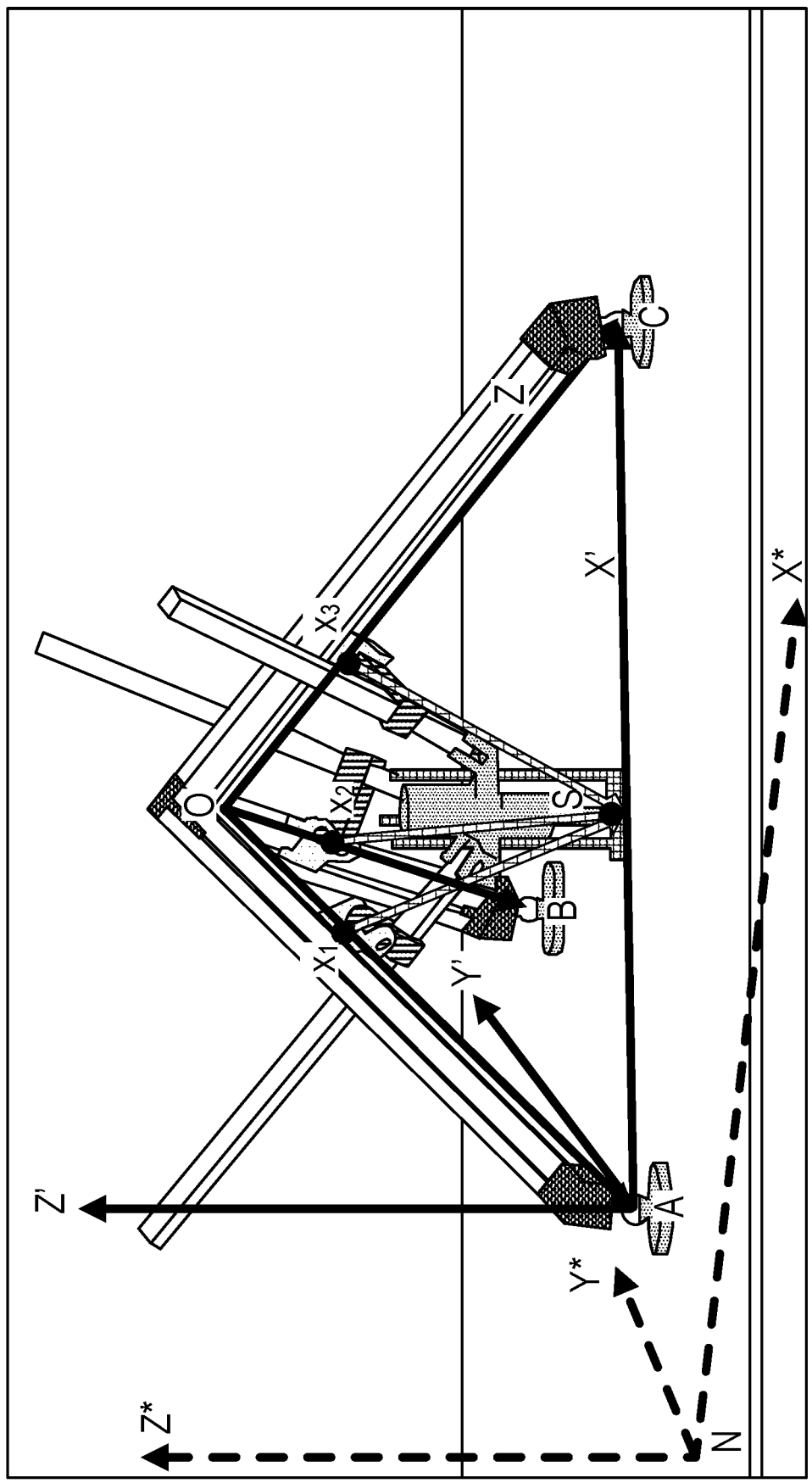
FIG. 14 illustrates a second moveable motion using the kinematics of FIG. 9, according to various embodiments.

In the second walking pattern, the translation performed in the walking motion is defined in the X*Y*Z* frame. FIG. 14 shows the setup of the coordinate frames to describe the second walking motion. The position of point A at any time with respect to the X*Y*Z* frame is denoted as $(r_{NA})_{X^*Y^*Z^*}$. Given any instant position of point A, the corresponding position of point B is given by the following:

$$(r_{NB})_{X^*Y^*Z^*} = (r_{NA})_{X^*Y^*Z^*} + (r_{AB})_{X^*Y^*Z^*} = (r_{NA})_{X^*Y^*Z^*} + R_{X^*Y^*Z^*}^{X'Y'Z'}(r_{AB})_{X'Y'Z'} \quad (14)$$

where, in the case of pyramid having the angle of 90 degrees between its beams with the beam length L:

$$(r_{AB})_{X'Y'Z'} = [0.7071 L \; 1.22474 L \; 0]^T \quad (15)$$

The corresponding position of point C can also be obtained in a similar manner.

The 3D translational motion of point A can be made in any direction in the 3D space expressed in the $X^*Y^*Z^*$ frame. If a planar translational motion is to be made, the z component of the vector $(r_{NA})_{X^*Y^*Z^*}$ should not be changed. A purely 3D translational motion can be defined as the translation of the origin (i.e., point A) of the X'Y'Z' frame expressed in the $X^*Y^*Z^*$ frame and is denoted as $(r_{AA'})_{X^*Y^*Z^*}$. During a single step of the second walking motion, the orientation of the pyramid with respect to the $X^*Y^*Z^*$ frame is maintained as a constant. The orientation is denoted as $R_{X^*Y^*Z^*}^{X'Y'Z'}$.

The new positions of points A, B, and C after a single walking step are given by the following:

$$(r_{NA'})_{X^*Y^*Z^*} = (r_{NA})_{X^*Y^*Z^*} + (r_{AA'})_{X^*Y^*Z^*} \quad (16)$$

$$(r_{NB'})_{X^*Y^*Z^*} = (r_{NB})_{X^*Y^*Z^*} + (r_{BB'})_{X^*Y^*Z^*} \quad (17)$$

$$(r_{NC'})_{X^*Y^*Z^*} = (r_{NC})_{X^*Y^*Z^*} + (r_{CC'})_{X^*Y^*Z^*} \quad (18)$$

To define a single walking step, either the vector $(r_{AA'})_{X^*Y^*Z^*}$ or the new position of the point A $(r_{NA'})_{X^*Y^*Z^*}$ should be defined. The position of the support can be defined in the $X^*Y^*Z^*$ frame. Subsequently, a kinematic transformation should be performed to express the position of the support in the X'Y'Z' frame and subsequently in the XYZ frame. Once the position of the support is expressed in the XYZ frame, the position of the actuators can be computed using the kinematics of the mechanism expressed in the XYZ frame.

Figure 15A:
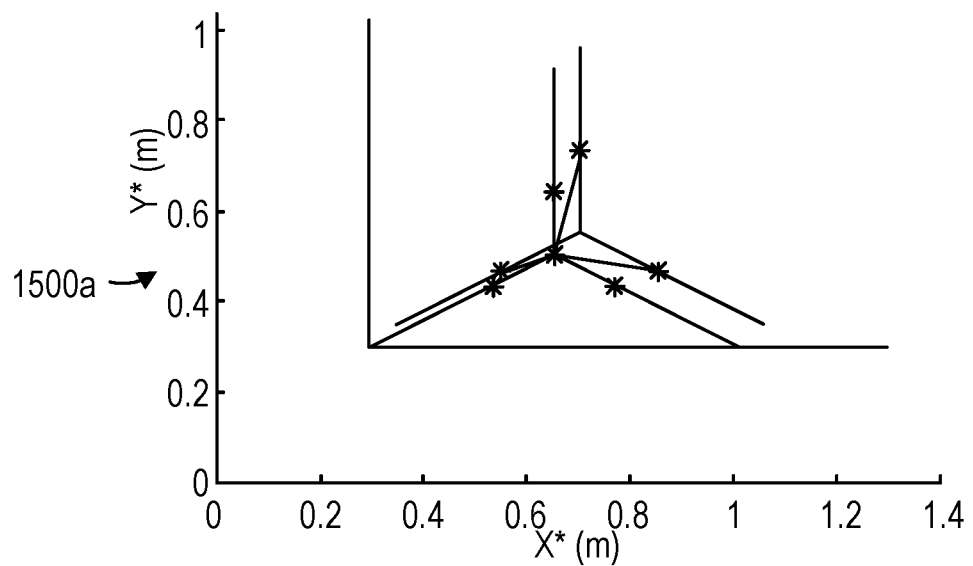
FIG. 15A is a top view of a first position and of a second position of the moveable robot of FIG. 2 after a three-dimensional translation, according to various embodiments.
Figure 15B:
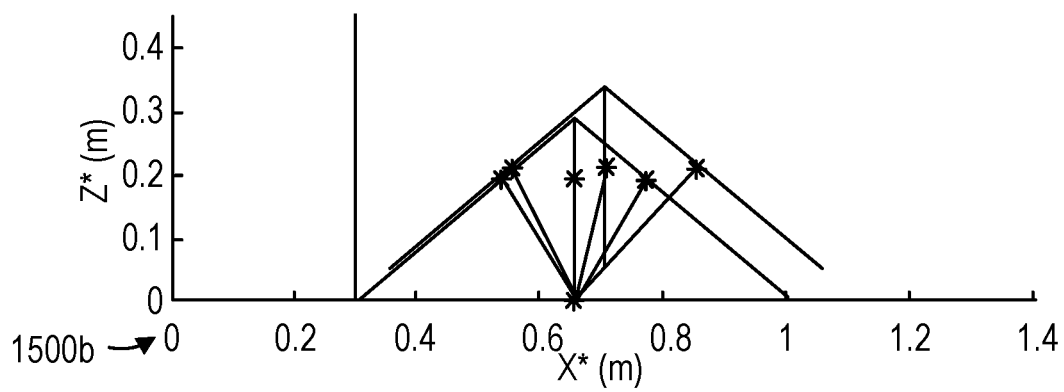
FIG. 15B is a side view of a first position and of a second position of the moveable robot of FIG. 2 after a three-dimensional translation, according to various embodiments.
Figure 15C:
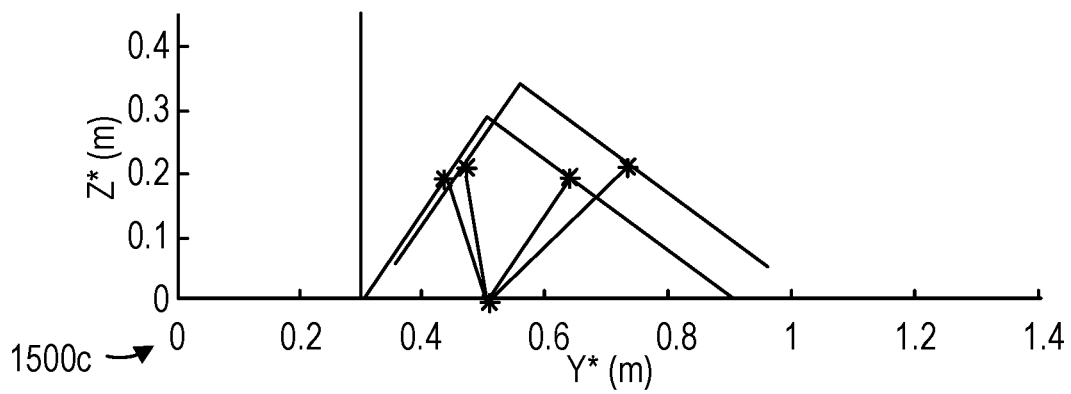
FIG. 15C is a different side view of a first position and of a second position of the moveable robot of FIG. 2 after a three-dimensional translation, according to various embodiments.

FIGS. 15A-C show various views 1500a-c of the robot 100 performing the second walking step with $(r_{NA'})_{X^*Y^*Z^*} = [50 \; 50 \; 50]^T$ millimeters. The initial position of point A is (300, 300, 0) millimeters with respect to the $X^*Y^*Z^*$ frame. The top view illustrates that the robot moves 50 millimeters in both the X and Y directions. The side views, on the other hand, show clearly that the robot moves upward by 50 millimeters.

To maintain stability in the second walking pattern, it is preferred to move in any direction perpendicular to one of the three edges of the pyramid triangular base as this results in a balance between right and left sides of the robot. To proceed in a certain direction, the robot can first rotate to head to the intended direction and subsequently in the certain direction.

Nevertheless, the robot still can move in any 3D direction.

8. Modified Topology for Workpiece Surface with Irregularity

In examples in which the surface of the workpiece is not flat or not a section of a spherical surface, the orientation of the tool mounted on the 3T moving platform may not be perpendicular to the tangent of the surface. Accordingly, the robot can be reconfigured by adding a module that adds two or three actuated rotational degrees of freedom. Such additional degrees of freedom will compensate possible non-perpendicularity of the tool. Not only are the additional degrees of freedom useful to adjust the tool to be perpendicular to the tangent of the workpiece surface at any situation, but also to enable five-axis/six-axis machining/processing.

Figure 16A:
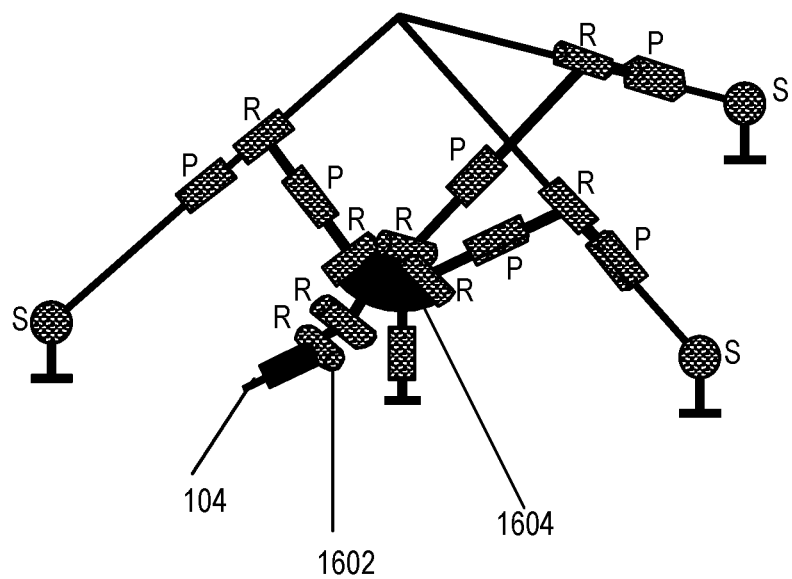
FIG. 16A is a schematic of another example of a moveable robot that includes a moveable platform, according to various embodiments.
Figure 16B:
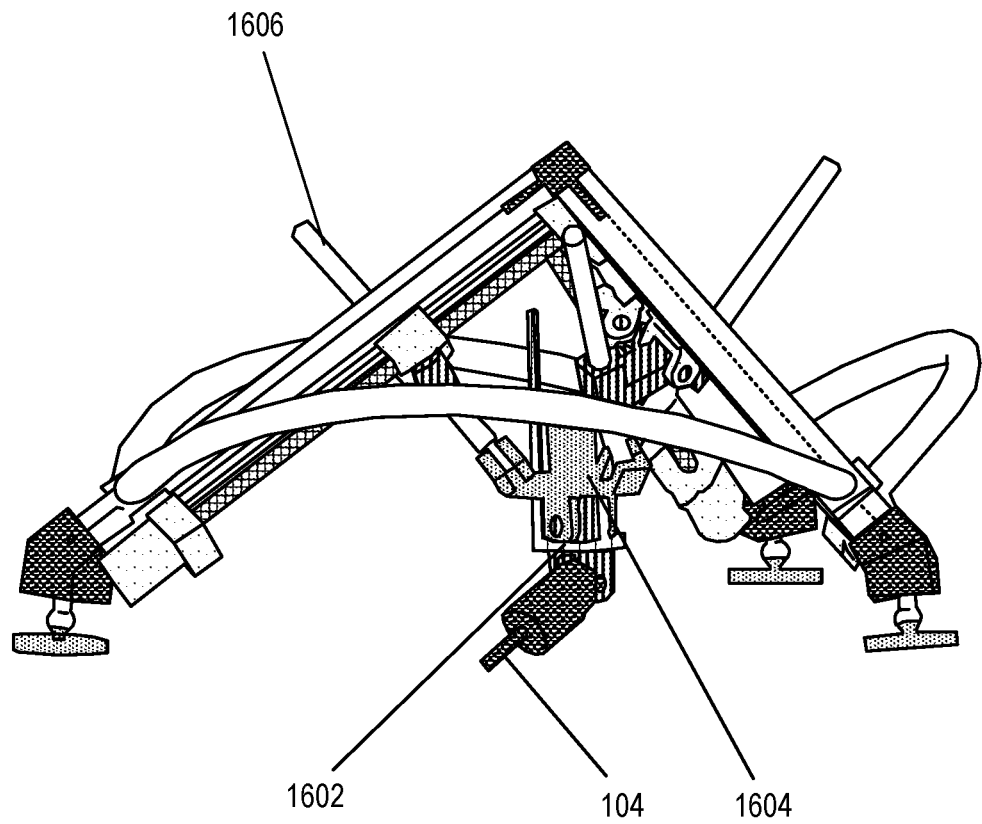
FIG. 16B is the moveable robot of FIG. 16A, according to various embodiments.

The first reconfiguration scheme involves a 2R module 1602 attached to the 3T moving platform 1604, as illustrated in FIGS. 16A-16B. The 2R module 1602 can be a serial or parallel 2R module. The topology of the first reconfiguration scheme can include 3A+3S+3PRRR+1RR (or 3A+3PRRR+1RR when the spherical joints are locked or eliminated) or 3A+3S+3PRPR+1RR (or 3A+3PRPR+1RR when the spherical joints are locked or eliminated). The second reconfiguration scheme involves adding a parallel mechanism that provides 3R mobility to the base of the 3T parallel mechanism 1606. The 3R parallel mechanism (not shown) is connected serially to the 3T parallel mechanism 1606. Accordingly, the resulting mechanism is a 3T3R hybrid-kinematics mechanism. While adding the 2R mechanism to the 3T moving platform turns the robot to a 5-DOF (3T2R) robot, adding the 3R mechanism to the 3T mechanism 1606 turns the robot to a 6-DOF (3T3R) robot.

Figure 17A:
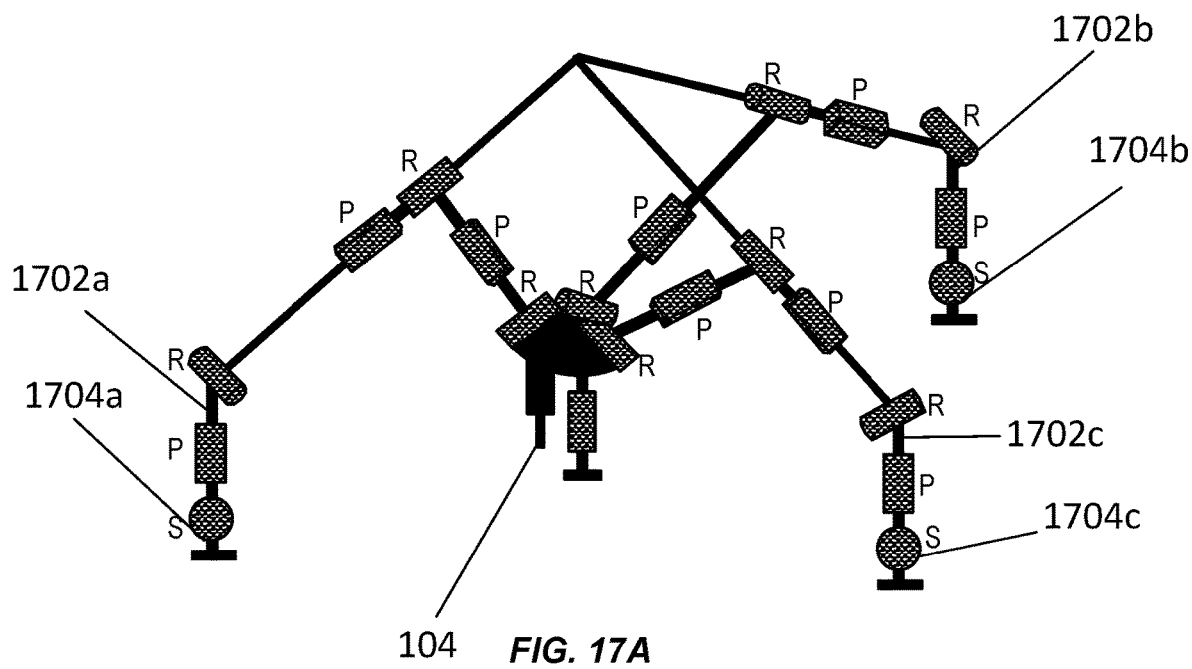
FIG. 17A is a schematic of another example of a moveable robot that includes actuated prismatic joints, according to various embodiments.
Figure 17B:
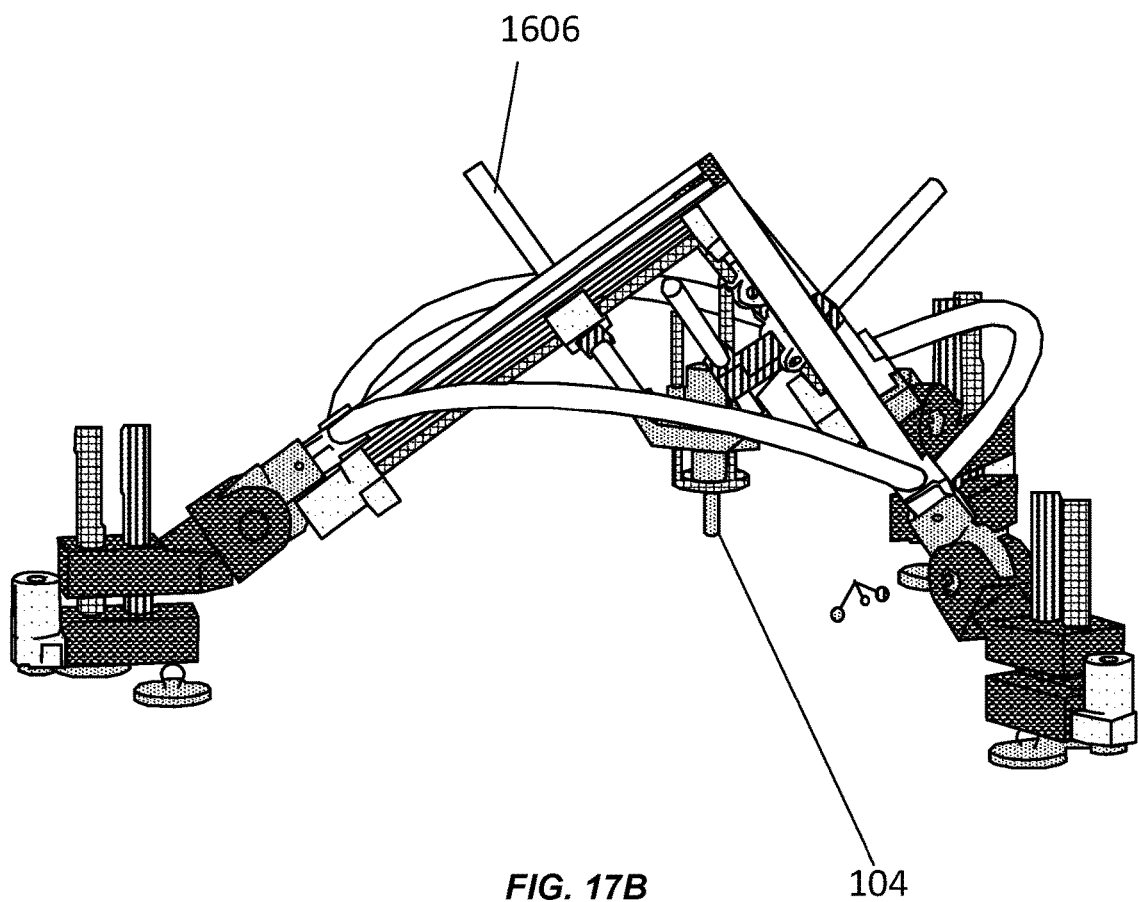
FIG. 17B is the moveable robot of FIG. 17A, according to various embodiments.
Figure 18:
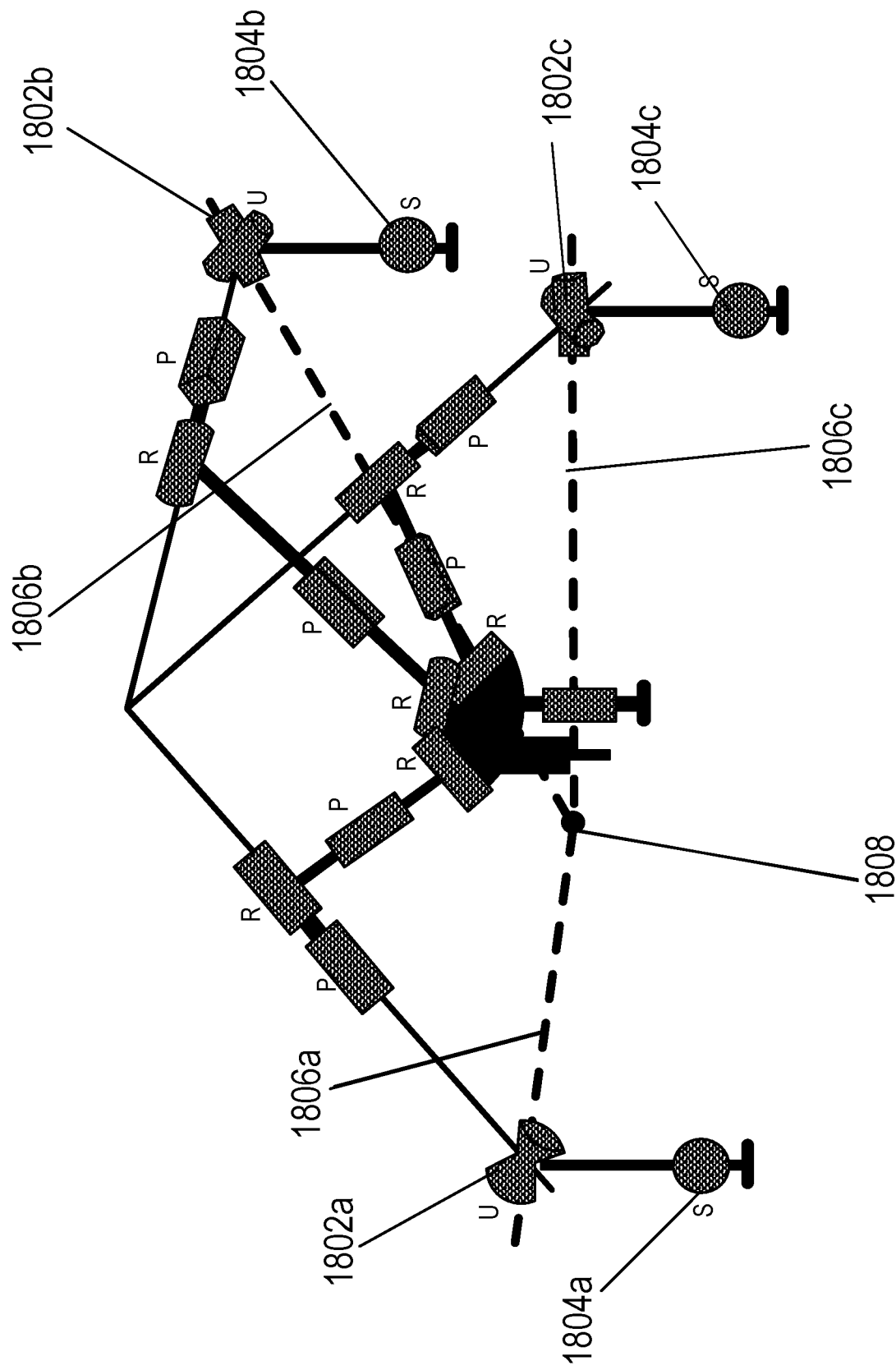
FIG. 18 is a schematic of another example of a moveable robot that includes universal joints, according to various embodiments.
Figure 19A:
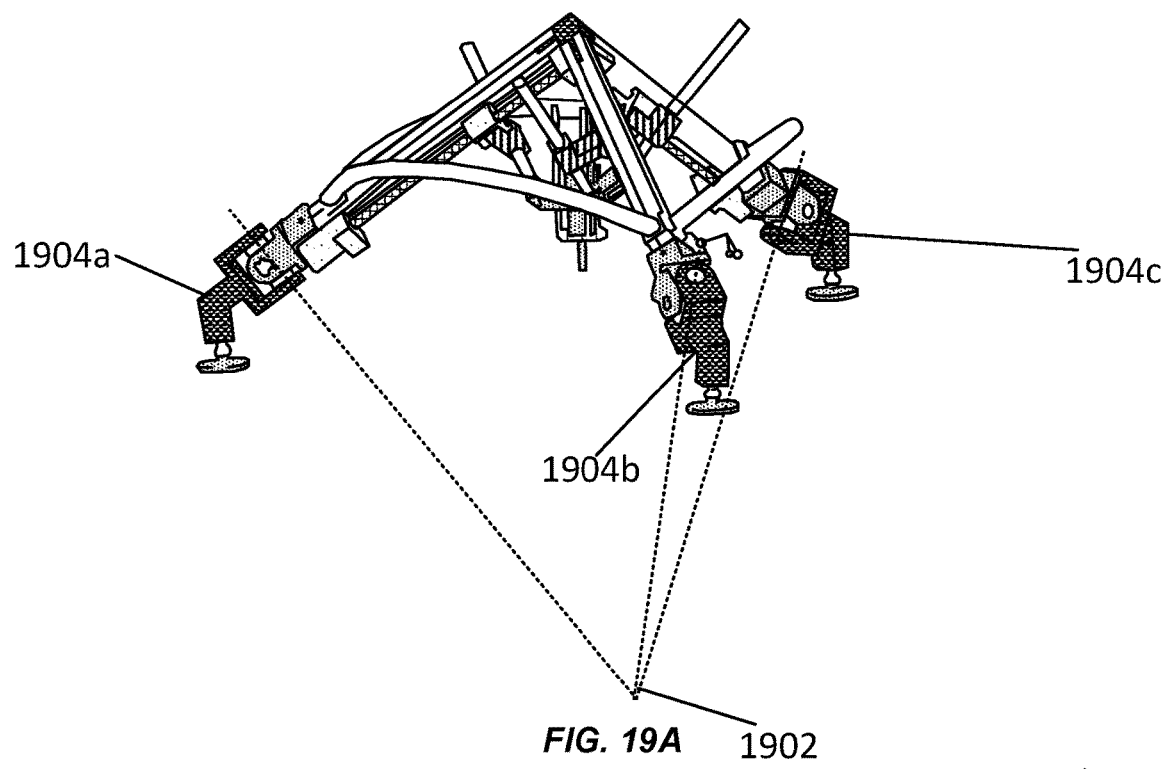
FIG. 19A is an illustration of an example of a moveable robot that includes various joints in a first joint configuration, according to various embodiments.
Figure 19B:
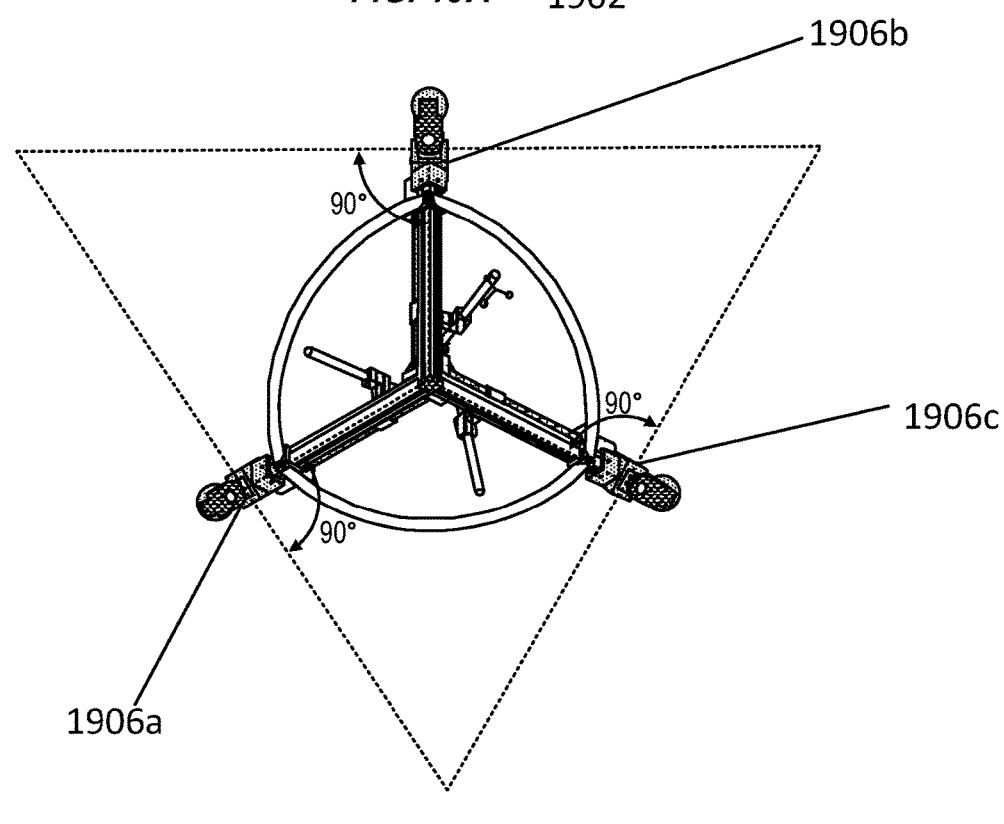
FIG. 19B is another illustration of the moveable robot of FIG. 19A, according to various embodiments.
Figure 20A:
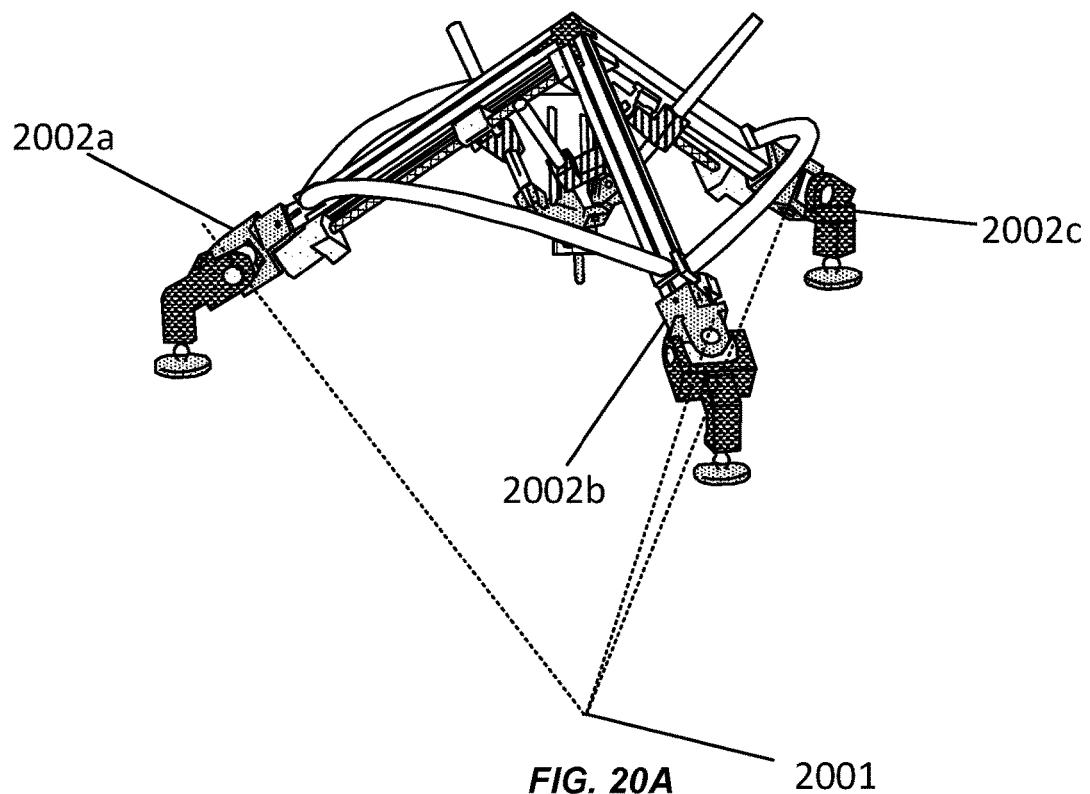
FIG. 20A is an illustration of another example of a moveable robot that includes various joints in a second joint configuration, according to various embodiments.
Figure 20B:
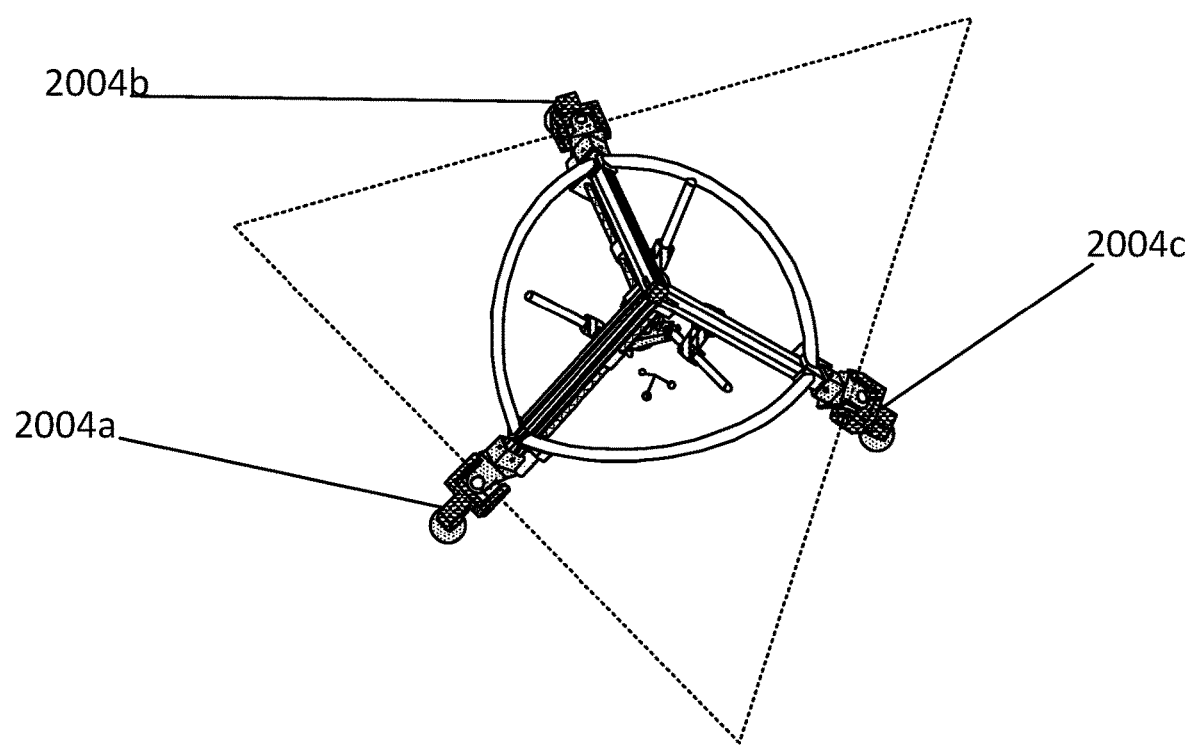
FIG. 20B is another illustration of the moveable robot of FIG. 20A, according to various embodiments.

Two symmetric parallel mechanisms, particularly 3SPR and 3SRIR (3SU), are proposed as 3R mechanisms. By adding any of the two 3R mechanisms to the 3T mechanism 1606, the orientation of the tool 104 can be adjusted within the tilting range of the 3R mechanisms. In the former topology, three PR kinematic chains 1702a-c, with the underlined letter indicates the actuated joint, are added between the base frames of the pyramid and the corresponding S joints 1704a-c, as illustrated in FIGS. 17A-17B. Accordingly, the topology of the robot can include 3A+3SPR+3PRRR or 3A+3SPR+3PRPR. In the latter topology, three RIR kinematic chains 1802a-c (universal joints) are added between the base frames of the pyramid and the corresponding S joints 1804a-c, as illustrated in FIG. 18. Accordingly, the topology of the robot can include 3A+3SRIR(3SU)+3PRRR or 3A+3SRIR(3SU)+3PRPR. The axes 1806a-c of corresponding revolute joints included in the universal joints in the three limbs meet at an intersection point 1808 during rotation of the mechanism. Two U joint configurations, as illustrated in FIGS. 19 and 20, can facilitate the intersection point. In the first U joint configuration, as illustrated in FIG. 19A, the intersection point 1902 is formed by the axes of the intermediate R joints 1904a-c of the SRIR kinematic chains, while the actuation is applied to the last R joints of the SRIR kinematic chains. The position of the intersection point 1902 changes with the rotation of the actuated, last R joints of the SRIR kinematic chains. The axes of the last R joints 1906a-c are fixed (i.e., always perpendicular) to the pyramid frames. The axes create an equilateral (equidistant) triangle as illustrated in FIG. 19B. In the second U joint configuration, as illustrated in FIG. 20A, the intersection point 2001 is formed by the axes of the last R joints 2002a-c of the SRIR kinematic chains while the actuation is applied to the intermediate R joints 2004a-c of the SRIR kinematic chains. While the axes of the intermediate R joints 2004a-c change orientation during a motion, the axes form an equilateral (equidistant) triangle as illustrated in FIG. 20B. While such an equilateral triangle is fixed with respect to the pyramid frames in the first U joint configuration, the equilateral triangle in the second U joint configuration changes orientation during motion. The 3R kinematic chains using both the U joint configurations can be denoted 3SRIR and 3SRIR, respectively, with the underlined letters indicating the actuated joints.

The robot can be transformed between the 3T and 3T2R configurations by reassembly. In other words, the robot is transformed to the 3T2R configuration by assembling the 2R module, whereas the robot is transformed to the 3T configuration by disassembling the 2R module. Additionally or alternatively, the robot can also be transformed between 3T and 3T3R configurations by either reassembly or joint locking/reconfiguration. The former method is performed by assembling the three PR or RIR kinematic chains to transform the robot to the 3T3R configuration and disassembling the kinematic chains to transform the robot to the 3T configuration. The latter method is performed by unlocking the three PR or RIR kinematic chains to transform the robot to the 3T3R configuration and locking/constraining the three PR or RIR kinematic chains to transform the robot to the 3T configuration.

9. The Use of Multiple Robots in Coordination

Figure 21:
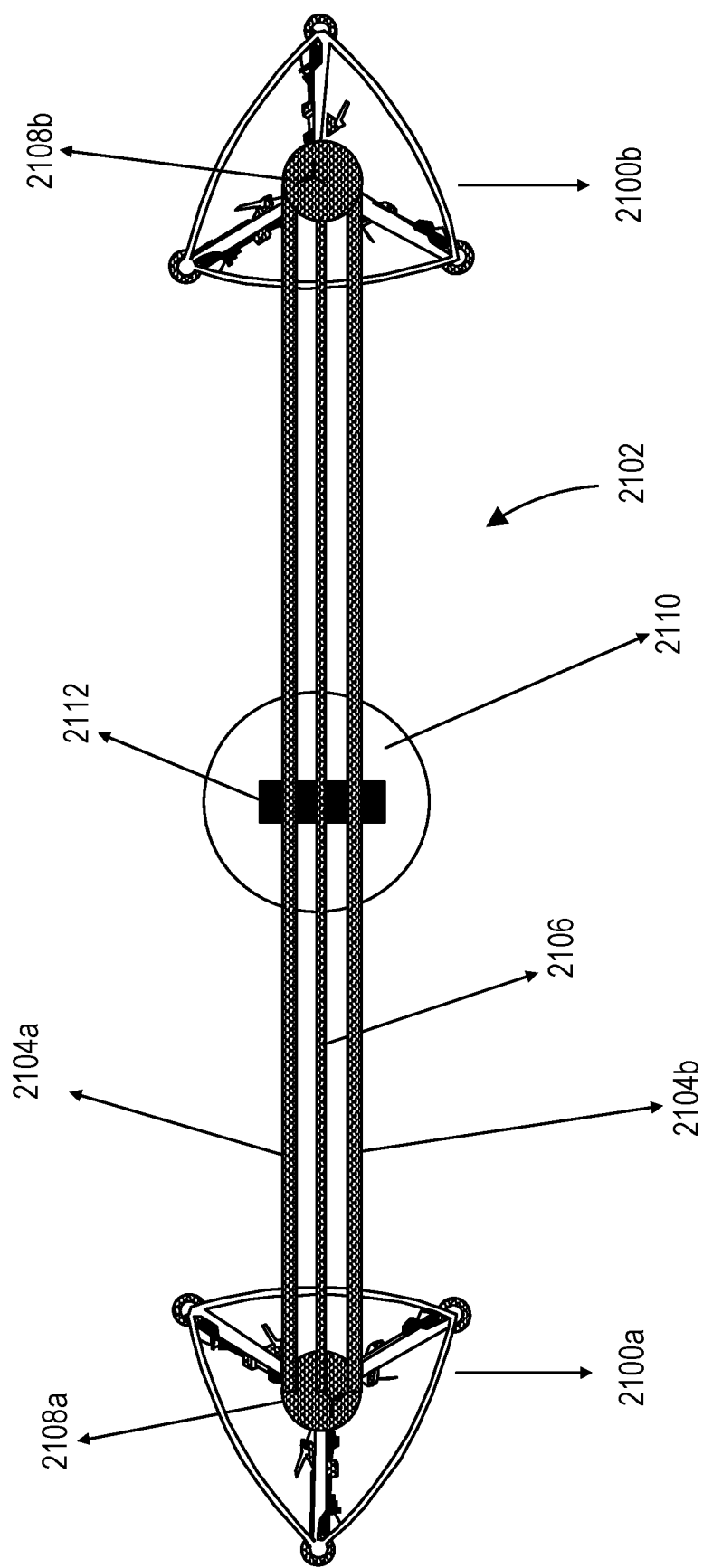
FIG. 21 is an illustration of an example use of multiple robots coordinating with each other by using a connecting physical system that mounts a tool, according to various embodiments.

Two or more walking robots, as described above, can be used in a coordination scheme to perform a certain task. For example, two robots 2100a-b as illustrated in FIG. 21 are coordinating with each other by utilizing a beam 2102 that connects the two robots. The connecting beam 2102 illustrated in FIG. 21 includes linear guides 2104a-b and a linear actuation system 2106. The connection between the beam and the robots can use spherical or universal joints 2108a-b to allow a relative motion between the two robots 2100a-b. The length of the connecting beam 2102 can also be made variable or adjustable to allow variable distance between the robots 2100a-b. In such examples, the connecting beam 2102 can include a passive prismatic joint. A machining/processing tool 2110 can be mounted to slide/glide 2112 along the connecting beam 2102. The motion of the tool 2110 along the connecting beam 2102 is actuated by the linear actuation system 2106 installed in the connecting beam 2102. Such a linear actuation system 2106 can use lead/ball screw, chain and sprockets, belt and pulleys, etc.

10. Conclusions

Novel walking robot topologies, particularly topologies including 3A+3S+3PRRR/3PRPR (or 3A+3PRRR/3PRPR when the spherical joints are locked or eliminated), 3A+3S+3PRRR/3PRPR+1RR (or 3A+3PRRR/3PRPR+1RR when the spherical joints are locked or eliminated), 3A+3SPR+3PRRR/3PRPR, and 3A+3SRIR(3SU)+3PRRR/3PRPR, are proposed. The 3A+3 S+3PRRR/3PRPR topology includes a 3PRRR/3PRPR parallel mechanism having 3T mobility, 3 attachment pads serially connected with S joints to the base frames of the 3PRPR mechanism, and a support attached to the moving platform that can be optionally retractable. When the robot is orthogonal, the robot includes a decoupled kinematics with a constant Jacobian, a large workspace, and a good stability. When used on a flat surface or a section of spherical surface, the tool is perpendicular to the tangential plane of the surface due to the axisymmetric geometry of the robot. The proposed 3A+3S+3PRRR/3PRPR robot (or 3A+3PRRR/3PRPR robot when the spherical joints are locked or eliminated) is also configured to perform two walking motions: (i) a 3D rotational walking pattern and (ii) a 3D translational walking pattern by using the actuators used for the manipulation and the support attached to the moving platform. The walking 3T robot can be reconfigured to a walking 3T2R or 3T3R robot configured to adjust the orientation of the tool perpendicular to an irregular surface of a workpiece/structure and to perform five-axis machining/processing tasks or six-axis machining/processing tasks. The 3T2R hybrid-kinematics robot includes 3A+3S+3PRRR/3PRPR+1RR topology, whereas the 3T3R hybrid-kinematics robot includes either 3A+3 SPR+3PRRR/3PRPR or 3A+3SRIR(3SU)+3PRRR/3PRPR topology. Furthermore, the 3A+3SRIR(3SU)+3PRRR/3PRPR topology is proposed in two variations.

Although the 3PRPR module in the proposed robot is preferred to be used in an orthogonal configuration, the 3PRPR module can also be used in a non-orthogonal configuration (i.e., the angle between the pyramid structure beams is not 90 degrees). Further, although the 3PRPR module is preferred to be actuated at their proximal P joints, the 3PRPR module can also be actuated at the intermediate P joints.

The walking robot disclosed herein can be used in a coordination scheme by using multiple robots connected by a beam or another physical system that mounts a tool.

The "spindle" and "tool" mentioned in figures or descriptions herein is an example of end-of-arm tools, which can be attached to the end-effector of the mechanism. In practice, any suitable end-of-arm tools can be used.

The spindle and tool attached to the end-effector is optional. If the robot is intended to only walk, the spindle and tool are not necessary to be attached to the end-effector. Alternatively, any tool can also be mounted to the robot at any other possible mounting position.

The term "machining" is one example of an application of the proposed robot disclosed herein. In real practice, the proposed robot can be used for any other suitable purpose/application. Thus, the term "processing" is also used to cover a broad spectrum of possible applications.

Based on the present disclosure, a person of ordinary skill in the art will appreciate other ways and/or methods to implement the various embodiments. The specification and drawings are, accordingly, to be regarded in an illustrative rather than in a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but, on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A robotic device, comprising:
   segments coupled together at proximal ends to form a pyramidal shape, each of the segments having a distal end coupled with an attachment device having an attachment mechanism configured to engage with a workpiece;
   arms having proximal ends moveable relative to the segments;
   a platform coupled to the arms, the platform useable as a support or coupled with a dedicated support, the platform coupled to the arms to position the platform between the proximal ends of the arms and the workpiece when at least one of the attachment mechanisms is engaged with the workpiece; and
   a tool coupled to the platform.

2. The robotic device of claim 1, wherein the attachment mechanism comprises an attachment surface configured to engage with a surface of the workpiece.

3. The robotic device of claim 1, wherein the attachment mechanism comprises a vacuum seal, magnetic pad, an adhesive, or a combination thereof.

4. The robotic device of claim 1, further comprising a pivot device positioned between the platform and the support, the pivot device configured to pivot the platform relative to the arms.

5. The robotic device of claim 4, wherein the pivot device is further configured to pivot the platform to position the tool generally perpendicular to a surface of the workpiece.

6. The robotic device of claim 1, wherein the attachment mechanism further comprises spherical joints positioned between the distal ends of the segments and the attachment mechanism, the spherical joints configured to rotate the attachment mechanism relative to the segments.

7. The robotic device of claim 1, wherein the platform or the dedicated support is coupled to the arms with actuated joints comprising motorized screws or linear actuators.

8. The robotic device of claim 1, further comprising a support, that is either fixed or retractable, having a proximal end coupled with the platform and a distal end with an engagement surface configured to engage with the workpiece.

9. The robotic device of claim 1, further comprising a pivoting head positioned between the platform and the tool, the pivoting head configured to pivot the tool relative to the platform.

10. The robotic device of claim 9, further comprising a support positioned between the pivoting head and the platform, the support configured to move the pivoting head relative to the platform.

11. The robotic device of claim 1, wherein the arms are moveable between a first position and a second position.

12. The robotic device of claim 1, wherein the pyramidal shape is moveable between a first position and a second position by moving the arms while, in a single motion step, the platform or the dedicated support is attached to the workpiece and some or all of the attachment devices are freed from the workpiece.

13. The robotic device of claim 1, further comprising an additional, modular mechanism coupled to the platform or the distal ends of segments of the pyramidal shape which provides rotational motion to the platform or the segments.

14. The robotic device of claim 1, further being used with another robot in a coordination scheme by using a connecting segment with fixed or variable length that is connected to both the robots by using joints that allow relative motion between the robots.

15. A method comprising:
   attaching, via an attachment mechanism, a robotic device to a workpiece, the robotic device comprising:
      segments coupled together at proximal ends to form a pyramidal shape, each of the segments having a distal end coupled with an attachment device having the attachment mechanism;
      a platform coupled to arms of the robotic device to position the platform between proximal ends of the arms and the workpiece when at least one of the attachment mechanisms is engaged with the workpiece; and
      a tool coupled to the platform;
   moving the robotic device from a first location of the workpiece to a second location of the workpiece via a walking pattern that involves the arms moving relative to the segments; and
   performing an operation at the second location using the tool.

16. The method of claim 15, wherein the walking pattern includes three-dimensional rotation motion or three-dimensional translation motion.

17. The method of claim 16, wherein moving the robotic device includes moving the robotic device via three-dimensional rotation motion by the walking pattern, and wherein moving the robotic device via three-dimensional rotation motion includes:
   attaching a first attachment device of the robotic device and the platform to the workpiece; and
   actuating at least two arms of the arms of the robotic device to move the robotic device rotationally in three-dimensions and with respect to the workpiece, wherein the at least two arms each include an attachment mechanism that is not attached to the workpiece.

18. The method of claim 16, wherein moving the robotic device includes moving the robotic device via three-dimensional translation motion by the walking pattern, and wherein moving the robotic device via three-dimensional translation motion includes:

attaching the platform to the workpiece; and actuating the arms of the robotic device to move the robotic device translationally in three-dimensions and with respect to the workpiece, wherein the arms each include the attachment mechanism that is not attached to the workpiece.

19. The method of claim 15, wherein attaching the robotic device to the workpiece includes positioning, via a pivot of the robotic device that is positioned between a support of the robotic device and the platform, the tool perpendicularly with respect to a surface of the workpiece.

20. The method of claim 15, wherein attaching the robotic device to the workpiece includes positioning, via a pivoting head of the robotic device that is positioned between the platform and the tool, the tool perpendicularly with respect to a surface of the workpiece.

* * * * *